US012606115B2

(12) United States Patent
Sato

(10) Patent No.: US 12,606,115 B2
(45) Date of Patent: Apr. 21, 2026

(54) VEHICLE SEAT

(71) Applicant: TS TECH CO., LTD., Asaka (JP)

(72) Inventor: Tsuyoshi Sato, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 0 days.

(21) Appl. No.: 19/100,773

(22) PCT Filed: Aug. 3, 2023

(86) PCT No.: PCT/JP2023/028373
    § 371 (c)(1),
    (2) Date: Feb. 3, 2025

(87) PCT Pub. No.: WO2024/029587
    PCT Pub. Date: Feb. 8, 2024

(65) Prior Publication Data
    US 2026/0042413 A1     Feb. 12, 2026

Related U.S. Application Data

(60) Provisional application No. 63/371,318, filed on Aug. 12, 2022, provisional application No. 63/370,433, filed on Aug. 4, 2022.

(30) Foreign Application Priority Data

Feb. 24, 2023     (JP) ................................. 2023-026981
Mar. 31, 2023     (JP) ................................. 2023-058866

(51) Int. Cl.
    *B60R 21/207*      (2006.01)
    *B60N 2/58*       (2006.01)
    *B60R 21/215*      (2011.01)
(52) U.S. Cl.
    CPC .............. *B60R 21/207* (2013.01); *B60N 2/58* (2013.01); *B60R 21/215* (2013.01)

(58) Field of Classification Search
    CPC ........ B60R 21/207; B60R 21/215; B60N 2/58
    See application file for complete search history.

(56) References Cited

U.S. PATENT DOCUMENTS

| | | | | |
|---|---|---|---|---|
| 5,472,228 A | * | 12/1995 | Bentley | ................. B60R 21/215 |
| | | | | 24/297 |
| 6,095,602 A | | 8/2000 | Umezawa et al. | |

(Continued)

FOREIGN PATENT DOCUMENTS

| | | |
|---|---|---|
| JP | 11129856 A | 5/1999 |
| JP | 2007176349 A | 7/2007 |

(Continued)

OTHER PUBLICATIONS

Japanese Office Action (w/ English Translation) for corresponding Application No. 2023058866, mailed Mar. 11, 2025, 8 pages.

(Continued)

*Primary Examiner* — Paul N Dickson
*Assistant Examiner* — Shams Dhanani
(74) *Attorney, Agent, or Firm* — Dority & Manning, P.A.

(57) ABSTRACT

A vehicle seat includes a frame; a pad disposed on the frame; a skin covering the pad; an airbag device attached to the frame, and including an airbag and an inflator; a guide member that is provided on an inner surface side of the skin at a position corresponding to the airbag device, and that guides a deployment of the airbag; and an engagement member that pulls the skin in the pad. A length in an up to down direction from a first upper end to a first lower end of the engagement member is longer than a length in the up to down direction from a first upper end portion to a first lower end portion of a first end portion of the guide member.

8 Claims, 16 Drawing Sheets

(56)     References Cited

U.S. PATENT DOCUMENTS

| 9,694,778 B1 * | 7/2017 | Veggian ............ B60R 21/23138 |
| 9,738,197 B2 * | 8/2017 | Tanabe ..................... B60N 2/72 |
| 2006/0113767 A1 * | 6/2006 | Tracht ................... B60R 21/207 |
| | | 280/730.2 |
| 2008/0073952 A1 * | 3/2008 | Tracht ................... B60R 21/207 |
| | | 297/216.13 |
| 2009/0206581 A1 * | 8/2009 | Lawall ................ B60R 21/2338 |
| | | 280/728.1 |
| 2009/0236832 A1 * | 9/2009 | Ilda ....................... B60R 21/213 |
| | | 280/743.1 |
| 2012/0174352 A1 | 7/2012 | Tsunoda |
| 2015/0307000 A1 | 10/2015 | Kozaki |
| 2021/0078518 A1 | 3/2021 | Tanabe et al. |

FOREIGN PATENT DOCUMENTS

| JP | 2008114636 A | 5/2008 |
| JP | 2013132328 A | 7/2013 |
| JP | 2022033340 A | 2/2022 |
| JP | 2022107812 A | 7/2022 |

OTHER PUBLICATIONS

PCT International Search Report (w/ English translation) for corresponding PCT Application No. PCT/JP2023/028373, mailed Oct. 24, 2023, 5 pages.
Written Opinion of the International Searching Authority for corresponding PCT Application No. PCT/JP2023/028373, mailed Oct. 24, 2023, 3 pages.

* cited by examiner

FRONT

OUTSIDE ⟵ ⟶ INSIDE
(RIGHT)      (LEFT)

REAR

VEHICLE SEAT

CROSS-REFERENCE TO RELATED APPLICATIONS

This application is the U.S. National Stage entry of International Application No. PCT/JP2023/028373, filed on Aug. 3, 2023, which, in turn, claims priority to U.S. Provisional Ser. No. 63/370,433, filed on Aug. 4, 2022; U.S. Provisional Ser. No. 63/371,318, filed on Aug. 12, 2022; Japanese Patent Application No. 2023-026981, filed Feb. 24, 2023; and Japanese Patent Application No. 2023-058866, filed Mar. 31, 2023, all of which are hereby incorporated herein by reference in their entireties for all purposes.

TECHNICAL FIELD

The present invention relates to a vehicle seat, particularly to a vehicle seat including an airbag device.

BACKGROUND ART

In recent years, a side airbag has been provided to a vehicle seat to protect an occupant from a side impact. The side airbag protects the occupant by cushioning and distributing the impact load.

A side airbag provided in a seat back efficiently transmits the inflation energy of an airbag to a joint portion (tear line) of a seam of a skin, thereby causing the joint portion to break in a short period of time.

For example, in a vehicle seat of PATENT LITERATURE 1, in order to deploy an airbag without delay, one end portion of a stay cloth is sewn together with a skin at a joint portion, and the other end portion of the stay cloth is fixed to a back frame.

In addition, for example, in a vehicle seat of PATENT LITERATURE 2, a suspender (attachment member) having a substantially triangular cross section is provided on a skin, and the skin is fixed to a cushion pad by engaging the suspender with a clip (engagement member) embedded in a pull-in groove of the cushion pad.

CITATION LIST

Patent Literature

PATENT LITERATURE 1: JP 2022-033340 A
PATENT LITERATURE 2: JP 2011-069417 A

SUMMARY OF INVENTION

Technical Problem

When the stay cloth as described in PATENT LITERATURE 1 is fixed to the cushion pad, together with the skin, it can be considered that the stay cloth is fixed to the cushion pad, together with the skin, by an engagement member such as the clip described in PATENT LITERATURE 2.

However, since the load of the stay cloth is applied to the engagement member when the side airbag is deployed, the engagement member may come off from the pull-in groove of the cushion pad, which is a risk.

The present invention has been made in view of the above-described problem, and an object of the present invention is to provide a vehicle seat capable of stably holding a load, which is applied to a stay cloth when an airbag is deployed, using a clip.

Solution to Problem

The above-described problem is solved by a vehicle seat of the present invention, the vehicle seat including: a frame; a pad disposed on the frame; a skin covering the pad; an airbag device attached to the frame, and including an airbag and an inflator; a guide member that is provided on an inner surface side of the skin at a position corresponding to the airbag device, and that guides a deployment of the airbag; and an engagement member that pulls the skin in the pad. The skin includes a center portion covering a central portion of the pad in a seat width direction, a first side portion joined to an end portion of the center portion in the seat width direction, a second side portion joined to an outer end portion of the first side portion in the seat width direction, a first joint portion at which the center portion and the first side portion are joined to each other, and a second joint portion at which the first side portion and the second side portion are joined to each other. The first joint portion is engaged with the engagement member, and is pulled in the pad. A break portion that breaks when the airbag is deployed is formed at the second joint portion. A first end portion that is an end portion on an outer side of the guide member in the seat width direction is joined to the first side portion at the break portion, and a second end portion that is an end portion on an inner side of the guide member in the seat width direction is joined to the first side portion at the first joint portion. A length in an up to down direction from a first upper end to a first lower end of the engagement member is longer than a length in the up to down direction from a first upper end portion to a first lower end portion of the first end portion of the guide member.

With the above-described configuration, a load applied to the guide member (stay cloth) when the airbag is deployed can be stably held by the engagement member (clip) with a simple structure.

In detail, when a force to cut the break portion (tear line) open is applied to the break portion during the deployment of the airbag, the guide member is supported by the engagement member; however, since the vertical length from the upper end to the lower end of the engagement member is longer than the vertical length of the end portion on the outer side of the guide member, the guide member can be stably held by the engagement member.

In this case, it is preferable that the first upper end portion of the guide member is disposed above the first upper end of the engagement member, and it is preferable that a length in the up to down direction between the first upper end portion of the guide member and the first upper end of the engagement member is shorter than the length in the up to down direction from the first upper end to the first lower end of the engagement member.

With the above-described configuration, even if the length of a pull-in groove cannot be ensured due to design constraints, and the engagement member cannot be disposed at an ideal position, an offset load from the guide member can be stably supported by the engagement member.

In this case, it is preferable that a second upper end portion of the second end portion of the guide member is disposed above the first upper end of the engagement member, and it is preferable that a second lower end portion of the second end portion of the guide member is disposed below the first lower end of the engagement member.

3

With the above-described configuration, the load applied to the guide member when the airbag is deployed can be more stably supported by the engagement member with a simple structure.

In this case, it is preferable that the engagement member includes a first engagement member and a second engagement member disposed below the first engagement member. It is preferable that the guide member includes a first guide member that is disposed at a position corresponding to a height of a chest of an occupant in the seat and that engages with the first engagement member, and a second guide member that is disposed at a position corresponding to the height of the waist of the occupant in the seat and that engages with the second engagement member. It is preferable that a length in the up to down direction from a second upper end to a second lower end of the second engagement member is longer than a length in the up to down direction from a third upper end portion to a third lower end portion on the outer side of the second guide member in the seat width direction.

With the above-described configuration, the load applied to the guide member when the airbag is deployed can be more stably held by the engagement member with a simple structure.

In this case, it is preferable that the engagement member includes a first engagement member and a second engagement member disposed below the first engagement member. It is preferable that the guide member includes a first guide member that is disposed at a position corresponding to a height of a chest of an occupant in the seat and that engages with the first engagement member, and a second guide member that is disposed at a position corresponding to the height of the waist of the occupant in the seat and that engages with the second engagement member. It is preferable that a gas blowing portion of the inflator is disposed closer to the first guide member than to the second guide member. It is preferable that a length in the up to down direction from a third upper end portion to a third lower end portion on the outer side of the second guide member in the seat width direction is longer than the length in the up to down direction from the first upper end portion to the first lower end portion.

With the above-described configuration, since the first guide member is located at a position in the vicinity of a high-pressure gas ejection port of the inflator, it is made easier for the break portion to be cut open, and the vertical length of the end portion on a break portion side is made longer, so that the second guide member located at a position separated from the high-pressure gas ejection port of the inflator can make it easier for the break portion to be cut open.

In this case, it is preferable that the engagement member includes a first engagement member and a second engagement member disposed below the first engagement member. It is preferable that the guide member includes a first guide member that is disposed at a position corresponding to a height of a chest of an occupant in the seat and that engages with the first engagement member, and a second guide member that is disposed at a position corresponding to the height of the waist of the occupant in the seat and that engages with the second engagement member. It is preferable that a gas blowing portion of the inflator is disposed closer to the second guide member than to the first guide member. It is preferable that a length in the up to down direction from a third upper end portion to a third lower end portion on the outer side of the second guide member in the seat width direction is longer than the length in the up to down direction from the first upper end portion to the first lower end portion.

With the above-described configuration, since the second guide member is located at a position in the vicinity of the high-pressure gas ejection port of the inflator, it can be made even easier for the break portion to be cut open.

In this case, it is preferable that the engagement member includes a first engagement member and a second engagement member disposed below the first engagement member. It is preferable that the second engagement member includes an upper engagement member, an intermediate engagement member disposed below the upper engagement member, and a lower engagement member disposed below the intermediate engagement member. It is preferable that the guide member includes a first guide member that is disposed at a position corresponding to a height of a chest of an occupant in the seat and that engages with the first engagement member, and a second guide member that is disposed at a position corresponding to the height of the waist of the occupant in the seat and that engages with the second engagement member. It is preferable that a length in the up to down direction from a third upper end portion to a third lower end portion on the outer side of the second guide member in the seat width direction is longer than the length in the up to down direction from the first upper end portion to the first lower end portion.

With the above-described configuration, by increasing the number of the engagement members that fix the second guide member of which the end portion on the break portion side has a long vertical length, the load applied to the guide member when the airbag is deployed can be more stably held by the engagement members.

Advantageous Effects of Invention

According to the present invention, the load applied to the guide member (stay cloth) when the airbag is deployed can be stably held by the engagement member (clip) with a simple structure.

In addition, according to the present invention, even if the length of the pull-in groove cannot be ensured due to design constraints, and the engagement member cannot be disposed at an ideal position, an offset load from the guide member can be stably supported by the engagement member.

In addition, according to the present invention, the load applied to the guide member when the airbag is deployed can be more stably held by the engagement member with a simple structure.

In addition, according to the present invention, it can be made easier for the break portion to be cut open.

In addition, according to the present invention, it can be made even easier for the break portion to be cut open.

In addition, according to the present invention, the load applied to the guide member when the airbag is deployed can be more stably held by the engagement member.

BRIEF DESCRIPTION OF DRAWINGS

FIG. 8 is a perspective view of a pull-in member and a misalignment suppression member of the first example.

FIG. 14 is a partial cross-sectional side view of a pull-in portion of the fourth example.

DESCRIPTION OF EMBODIMENTS

First Embodiment

Hereinafter, a first embodiment according to the present invention will be described with reference to FIGS. 1 to 5.

In the following description, the "front to rear direction" is a front to rear direction of a vehicle seat, and is a direction that coincides with a traveling direction of a vehicle when traveling. In addition, the "seat width direction" is a width direction of the vehicle seat, and is a direction that coincides with a right to left direction when viewed from an occupant seated in the vehicle seat. In addition, the "up to down direction" is an up to down direction of the vehicle seat, and is a direction that coincides with a vertical direction when the vehicle travels on a horizontal surface.

Overall Configuration of Seat

Figure 1:
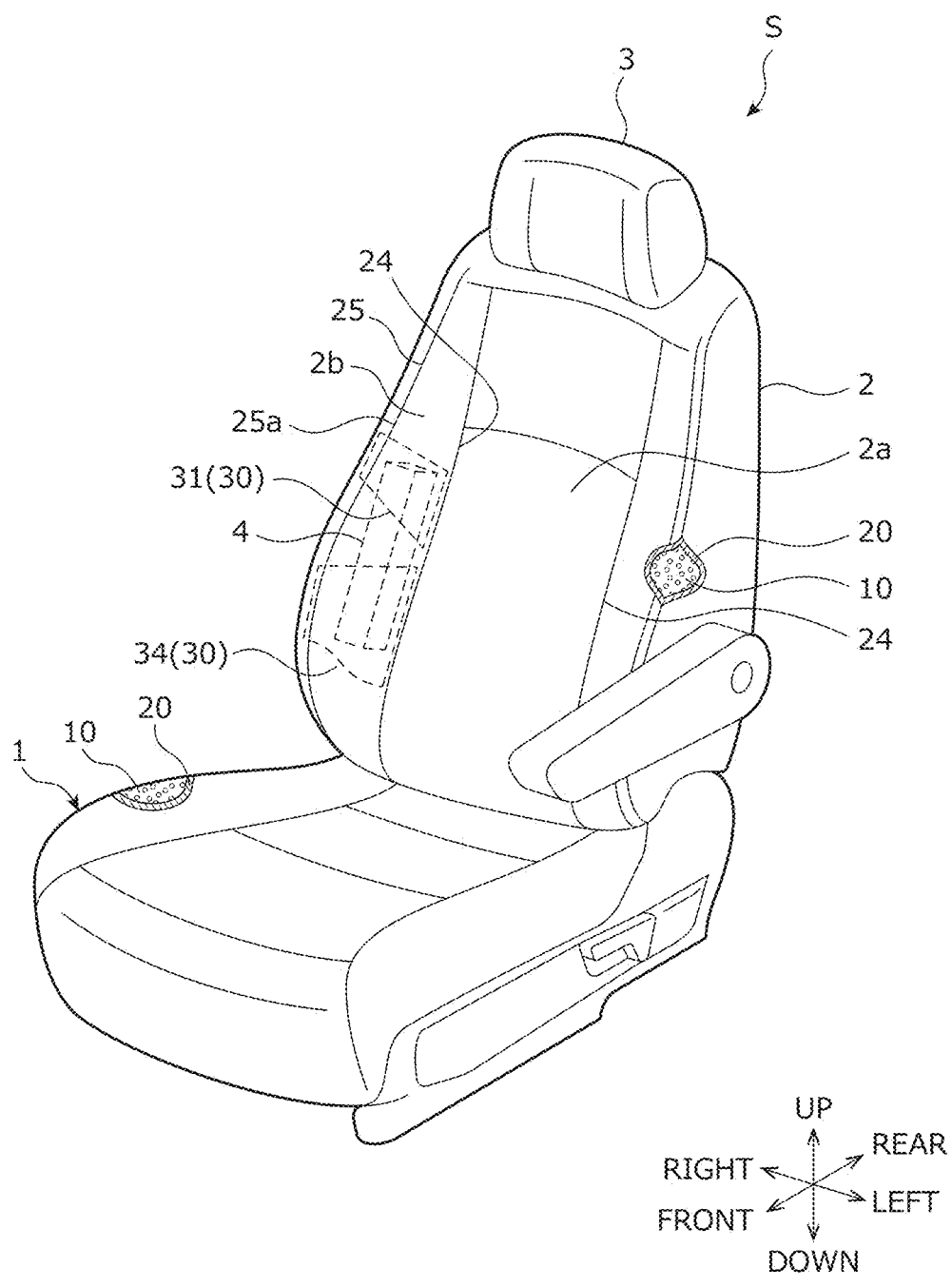
FIG. 1 is a perspective view of a vehicle Seat according to a first embodiment.

As shown in FIG. 1, a vehicle seat S1 of the present embodiment is a seat which is placed on a vehicle body floor, and in which the occupant of the vehicle is seated. In the present embodiment, the vehicle seat S1 is used as a front seat corresponding to a front seat of the vehicle. However, the vehicle seat S1 is not limited to the front seat, and the vehicle seat S1 may be a rear seat of the vehicle, and can also be used as a middle seat in a second row or a rear seat in a third row of a vehicle including three rows of seats in the front to rear direction.

Figure 2:
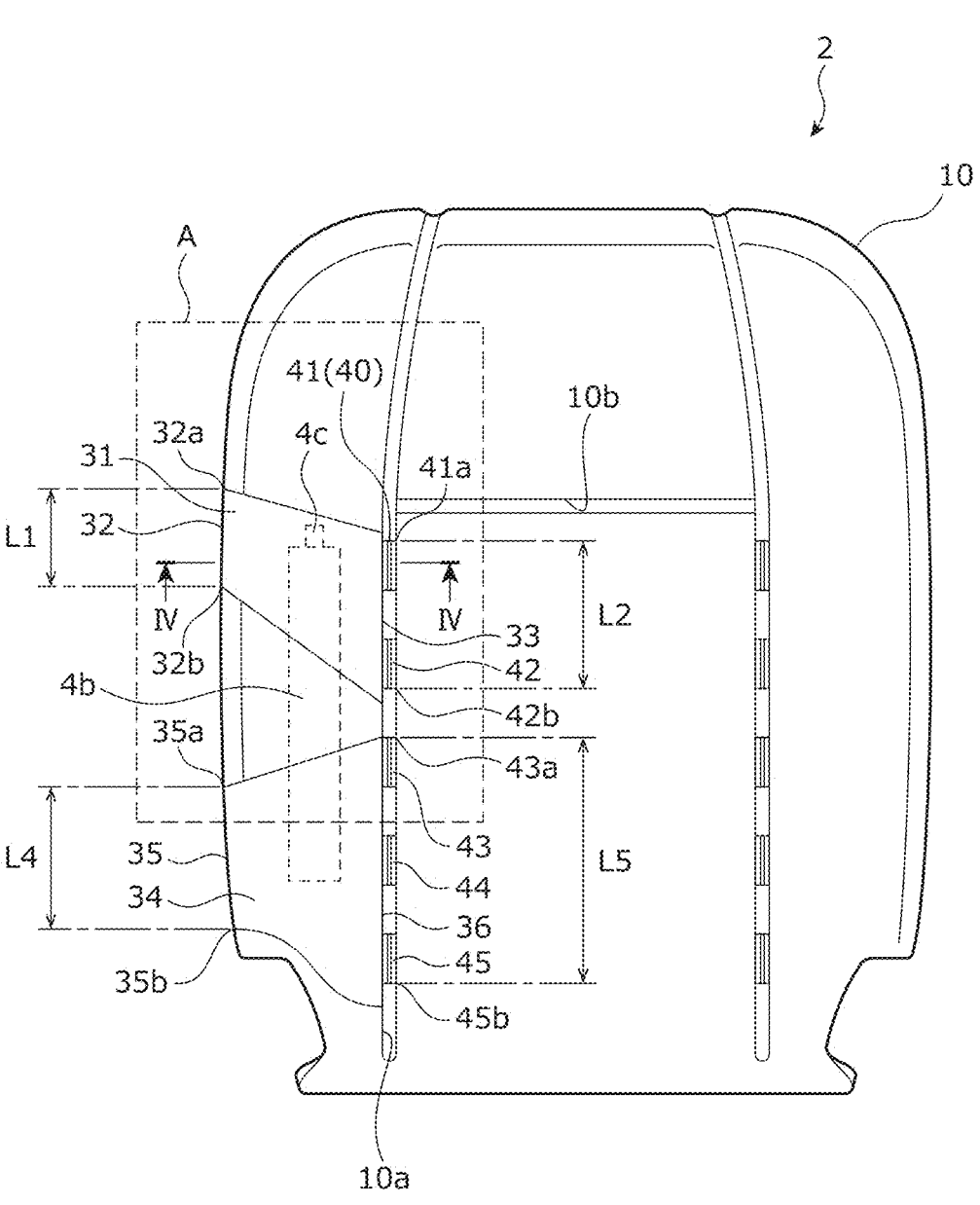
FIG. 2 is a front view of a seat back, and is a view showing a state where a skin is removed.

As shown in FIGS. 1 and 2, the vehicle seat S1 is mainly composed of a seat body including a seat cushion 1, a seat back 2, and a headrest 3, and an airbag device 4.

A seat frame F is provided inside the vehicle seat S1. Each of the seat cushion 1 and the seat back 2 includes a pad 10 disposed on the seat frame F, and a skin 20 covering the pad 10. In addition, the seat back 2 includes a stay cloth 30 (guide member) on an inner surface side (pad 10 side) of the skin 20 at a location corresponding to the airbag device 4.

The pad 10 includes a clip 40 (engagement member) for pulling in the skin 20. The skin 20 includes an attachment member 50 that engages with the clip 40. The skin 20 is pulled in and fixed to the pad 10 by engaging the attachment member 50 with the clip 40.

Incidentally, the clip 40 is provided as an example of the engagement member; the present invention is not limited thereto, and the skin 20 may be engaged with the pad 10 by a wire member.

As shown in FIG. 1, the seat cushion 1 is a seating portion that supports the occupant from below, and is configured by placing the pad 10 on a cushion frame (not shown) serving as the skeleton of the seat cushion 1, and covering the pad 10 with the skin 20.

Figure 4:
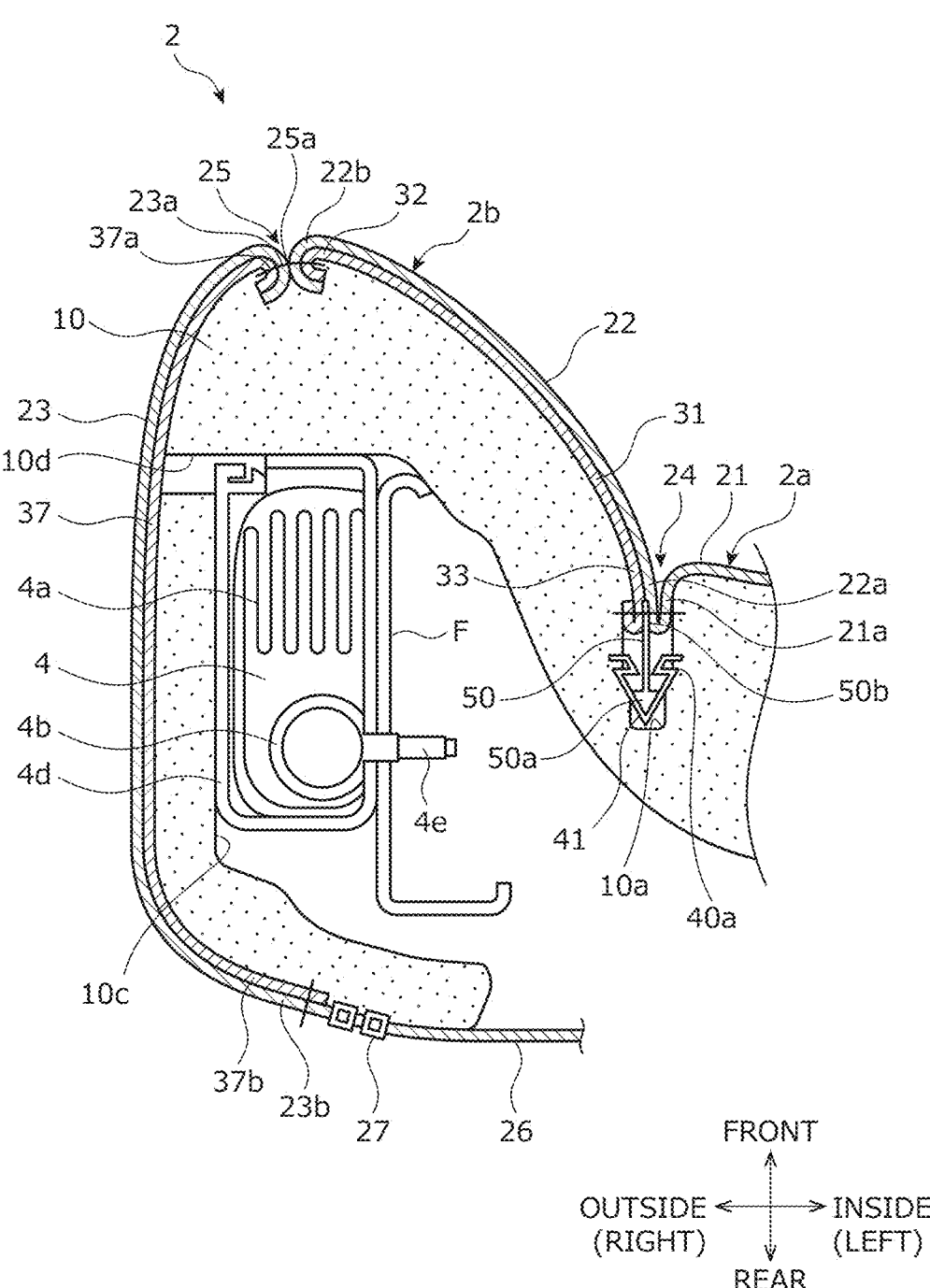
FIG. 4 is a cross-sectional view taken along line IV-IV of FIG. 2.

The seat back 2 is a backrest portion that supports the back of the occupant from the rear, and is configured by placing the pad 10 on the seat frame F (back frame) shown in FIG. 4 that serves as the skeleton of the seat back 2, and covering the pad 10 with the skin 20.

The seat back 2 includes a back center portion 2a that supports the occupant from the rear, and bolster portions 2b that support the occupant from the sides.

The headrest 3 is a head portion that supports the head of the occupant from the rear, and is configured by placing a pad material on pillars (not shown) serving as a core material, and covering the pad material with a skin material.

As shown in FIGS. 1, 2, and 4, the airbag device 4 has a known configuration, is attached to the seat frame F, and is disposed inside the bolster portion 2b of the seat back 2 and on an inner side of the skin 20.

The airbag device 4 includes an airbag 4a; an inflator 4b that supplies gas to the airbag 4a; a gas blowing portion 4c that ejects the gas into the airbag 4a; a casing 4d that covers the airbag 4a, the inflator 4b, and the gas blowing portion 4c, and a fastener 4e that fixes the casing 4d to the seat frame F.

As shown in FIG. 4, the airbag device 4 is attached to a right side of the seat frame F (an outer side of the vehicle seat S1) using the fastener 4e such as a bolt, and is accommodated inside the pad 10. When the gas is ejected from the gas blowing portion 4c by the inflator 4b and the airbag 4a is inflated to the outside of the casing 4d, the pad 10 breaks, the skin 20 is cut open, and the airbag 4a is deployed outward.

Pad

The pad 10 is configured such that a cushion portion is formed from a foam and the cushion portion is covered with the skin 20. As the foam, polypropylene bead foam, polyethylene bead foam, polypropylene foam, polyethylene foam, acrylonitrile-styrene foam, ethylene vinyl acetate copolymer resin, urethane foam material, or the like, or a combination thereof is used. In the present embodiment, the pad 10 is a urethane pad molded by foam molding using a urethane foaming agent.

As shown in FIG. 2, two pull-in grooves 10a extending in a seat longitudinal direction and a lateral pull-in groove 10b extending in the seat width direction are formed in the pad 10 of the seat back 2. The lateral pull-in groove 10b connects upper ends of the two pull-in grooves 10a. Incidentally, the disposition of the pull-in grooves 10a and the lateral pull-in groove 10b is one example, and the two pull-in grooves 10a and the lateral pull-in groove 10b may be formed in a substantially H-shape when viewed from the front of the seat by disposing the lateral pull-in groove 10b between the two pull-in grooves 10a.

A plurality of the clips 40 are provided at predetermined spacings inside each of the pull-in grooves 10*a*. The clips 40 are fixed to the pad 10 by being partially embedded in a bottom portion of the pull-in groove 10*a* as shown in FIG. 4.

As shown in FIG. 4, an accommodation portion 10*c* that accommodates the airbag device 4, and a slit 10*d* that makes it easier for the pad 10 to break are formed in the pad 10 of the seat back 2.

The accommodation portion 10*c* is a space that accommodates the airbag device 4 attached to the seat frame F. The slit 10*d* is a portion that is broken by the airbag 4*a* inflated from the casing 4*d*.

Skin

The skin 20 is made of fabric, film, cloth, leather, sheet, or the like, and is attached to cover the pad 10 in a state where the skin 20 is stretched such that a predetermined tension is applied thereto.

As shown in FIGS. 1 and 4, the skin 20 covering the seat back 2 includes a center portion 21 covering a front side of the back center portion 2*a*; a first side portion 22 covering an inner side (occupant side) of the bolster portion 2*b* in the seat width direction; and a second side portion 23 covering the outer side of the bolster portion 2*b* in the seat width direction.

The first side portion 22 is joined to an end portion 21*a* on the outer side of the center portion 21 in the seat width direction. The second side portion 23 is joined to a first side portion outer end portion 22*b* on the outer side of the first side portion 22 in the seat width direction.

As shown in FIGS. 1 and 4, at a first joint portion 24 (joint portion) at which the center portion 21 and the first side portion 22 are joined to each other, the end portion 21*a* of the center portion 21 and a first side portion inner end portion 22*a* are connected to each other by sewing.

At a second joint portion 25 (joint portion) at which the first side portion 22 and the second side portion 23 are joined to each other, the first side portion outer end portion 22*b* and a front end portion 23*a* of the second side portion 23 are connected to each other by sewing. A break portion 25*a* (tear line) that breaks when the airbag 4*a* is deployed is formed at the second joint portion 25.

Incidentally, a rear end portion 23*b* of the second side portion 23 is connected, via a linear fastener 27, to a skin back portion 26 covering a back surface side of the pad 10.

Stay Cloth

The stay cloth 30 is a guide member that guides deployment of the airbag 4*a*. As shown in FIGS. 1 to 4, the stay cloth 30 is disposed on the inner surface side (pad 10 side) of the skin 20 at a location corresponding to the airbag device 4.

The stay cloth 30 includes an inner stay cloth (a chest stay cloth 31 and a waist stay cloth 34) provided along the first side portion 22, and an outer stay cloth 37 provided along the second side portion 23. The inner stay cloth is divided into upper and lower portions, and includes the chest stay cloth 31 (first guide member) disposed at the height of the chest of the occupant, and the waist stay cloth 34 (second guide member) disposed below the chest stay cloth 31 and at the height of the waist of the occupant.

The stay cloth 30 is also referred to as an inner stay cloth, and is formed from a material having a smaller amount of tensile elongation than the skin 20. In other words, the stay cloth 30 is formed from a sheet-shaped member having less elasticity than the skin 20. For that reason, the stay cloth 30 can transmit a force applied when the airbag 4*a* is deployed to the break portion 25*a* that is a tear line, and can promote the deployment of the airbag 4*a*.

As shown in FIGS. 1 and 2, one end portion of the stay cloth 30 in the seat width direction is joined to the first side portion 22 at the break portion 25*a* of the second joint portion 25, and the other end portion of the stay cloth 30 in the seat width direction is joined to the first side portion 22 at the first joint portion 24. The stay cloth 30 is pulled in and fixed to the pad 10, together with the skin 20, by engaging the attachment member 50 with the clip 40.

The chest stay cloth 31 is fixed to the skin 20 by sewing together an end portion on the outer side of the chest stay cloth 31 in the seat width direction (chest stay cloth outer end portion 32) and the first side portion outer end portion 22*b* of the first side portion 22 at the second joint portion 25, and sewing together an end portion on the inner side of the chest stay cloth 31 in the seat width direction (chest stay cloth inner end portion 33) and the first side portion inner end portion 22*a* of the first side portion 22 at the first joint portion 24. Since the chest stay cloth 31 is sewn, together with the skin 20, to the attachment member 50, the chest stay cloth 31 is pulled in and fixed to the pad 10 by engaging the attachment member 50 with the clip 40.

The waist stay cloth 34 is fixed to the skin 20 by sewing together one end portion of the waist stay cloth 34 in the seat width direction (waist stay cloth outer end portion 35) and the first side portion outer end portion 22*b* of the first side portion 22 at the second joint portion 25, and sewing together the other end portion of the waist stay cloth 34 (waist stay cloth inner end portion 36) and the first side portion inner end portion 22*a* of the first side portion 22 at the first joint portion 24. Since the waist stay cloth 34 is sewn, together with the skin 20, to the attachment member 50, the waist stay cloth 34 is pulled in and fixed to the pad 10 by engaging the attachment member 50 with the clip 40.

The outer stay cloth 37 is fixed to the skin 20 by sewing together a front end portion of the outer stay cloth 37 in the seat front to rear direction (outer stay cloth front end portion 37*a*) and the front end portion 23*a* of the second side portion 23 at the second joint portion 25, and sewing together a rear end portion of the outer stay cloth 37 (outer stay cloth rear end portion 37*b*) and the rear end portion 23*b* of the second side portion 23.

When the airbag 4*a* is inflated by the airbag device 4, the inflation energy of the airbag 4*a* is transmitted to the stay cloth 30 via the pad 10. When the chest stay cloth 31, the waist stay cloth 34, and the outer stay cloth 37 receive the inflation energy of the airbag 4*a*, the inflation energy of the airbag 4*a* is concentrated on a stitching thread of the second joint portion 25 (break portion 25*a*), and the stitching thread is cut. Then, the chest stay cloth 31, the waist stay cloth 34, and the outer stay cloth 37 are separated at the second joint portion 25, the pad 10 is broken at the slit 10*d*, and the airbag 4*a* is deployed outward.

Here, the gas blowing portion 4*c* of the inflator 4*b* of the airbag device 4 is disposed closer to the chest stay cloth 31 than to the waist stay cloth 34. Namely, the chest stay cloth 31 is more likely to receive a load from the airbag 4*a* than the waist stay cloth 34. For that reason, the break portion 25*a* in the vicinity of the chest stay cloth 31 is more likely to be cut open than the break portion 25*a* in the vicinity of the waist stay cloth 34.

Clip

As shown in FIG. 4, the clip 40 is an engagement member formed with a substantially V-shaped cross section. The clip 40 includes a holding portion 40a that holds the attachment member 50. Incidentally, the clip 40 may be formed with a U-shaped or C-shaped cross section.

The clip 40 is made of resin and, for example, is formed from polyacetal (POM) resin, polypropylene (PP) resin, polyamide (PA) resin, polycarbonate (PC) resin, or the like. Incidentally, it is preferable that the clip 40 is formed from polyacetal (POM) resin having relatively high strength.

As shown in FIG. 2, the plurality of clips 40 are provided at the predetermined spacings inside each of the pull-in grooves 10a of the pad 10. By forming the clips 40 integrally with the pad 10 during foam molding of the pad 10, the clips 40 are attached to the pad 10 in a state where the clips 40 are embedded in the pad 10.

The skin 20 and the stay cloth 30 are pulled in and fixed to the pad 10 by engaging the attachment member 50 with the clips 40 at the first joint portion 24 provided at a position corresponding to the pull-in groove 10a. Incidentally, the clips 40 may be provided in the lateral pull-in groove 10b.

As shown in FIGS. 1 and 2, at the bolster portion 2b on the right side of the seat back 2 in the seat width direction, namely, a location corresponding to the airbag device 4, the clips 40 include first engagement members (a first clip 41 and a second clip 42) that pull the chest stay cloth 31 in the pad 10, and second engagement members (a third clip 43, a fourth clip 44, and a fifth clip 45) that are disposed below the first engagement members, and that pull the waist stay cloth 34 in the pad 10.

The chest stay cloth 31 is engaged with the first clip 41 and the second clip 42, and is pulled in the pad 10. The waist stay cloth 34 is engaged with the third clip 43, the fourth clip 44, and the fifth clip 45 disposed below the first clip 41 and the second clip 42, and is pulled in the pad 10.

The first clip 41 pulls in an upper portion of the chest stay cloth inner end portion 33 to fix the chest stay cloth 31 to the pad 10.

The second clip 42 is provided below the first clip 41, and pulls a lower portion of the chest stay cloth inner end portion 33 to fix the chest stay cloth 31 to the pad 10.

The third clip 43 (upper engagement member) pulls an upper portion of the waist stay cloth inner end portion 36 to fix the waist stay cloth 34 to the pad 10.

The fourth clip 44 (intermediate engagement member) is provided below the third clip 43, and pulls a central portion of the waist stay cloth inner end portion 36 in the up to down direction to fix the waist stay cloth 34 to the pad 10.

The fifth clip 45 (lower engagement member) is provided below the fourth clip 44, and pulls a lower portion of the waist stay cloth inner end portion 36 to fix the waist stay cloth 34 to the pad 10.

Attachment Member

As shown in FIG. 4, the attachment member 50 is a hook including a tip portion formed with an arrowhead-shaped cross section. The attachment member 50 is made of resin and, for example, is formed from polypropylene (PP) resin.

The attachment member 50 includes a tip portion 50a inserted into the holding portion 40a, and a base end portion 50b connected to the skin 20. The base end portion 50b is sewn to the skin 20 and the chest stay cloth 31 at the first joint portion 24. Incidentally, the attachment member 50 is indirectly connected to the skin 20 via a nonwoven fabric (not shown). One end side of the nonwoven fabric is fixed to the skin 20 at the first joint portion 24 by sewing, and the other end side of the nonwoven fabric is connected to the base end portion 50b of the attachment member 50 by sewing.

In such a manner, the skin 20 and the stay cloth 30 are pulled in and fixed to the pad 10 by engaging the tip portion 50a of the attachment member 50 with the holding portions 40a of the clips 40 at the first joint portion 24.

Disposition of Stay Cloth and Clip

Figure 3:
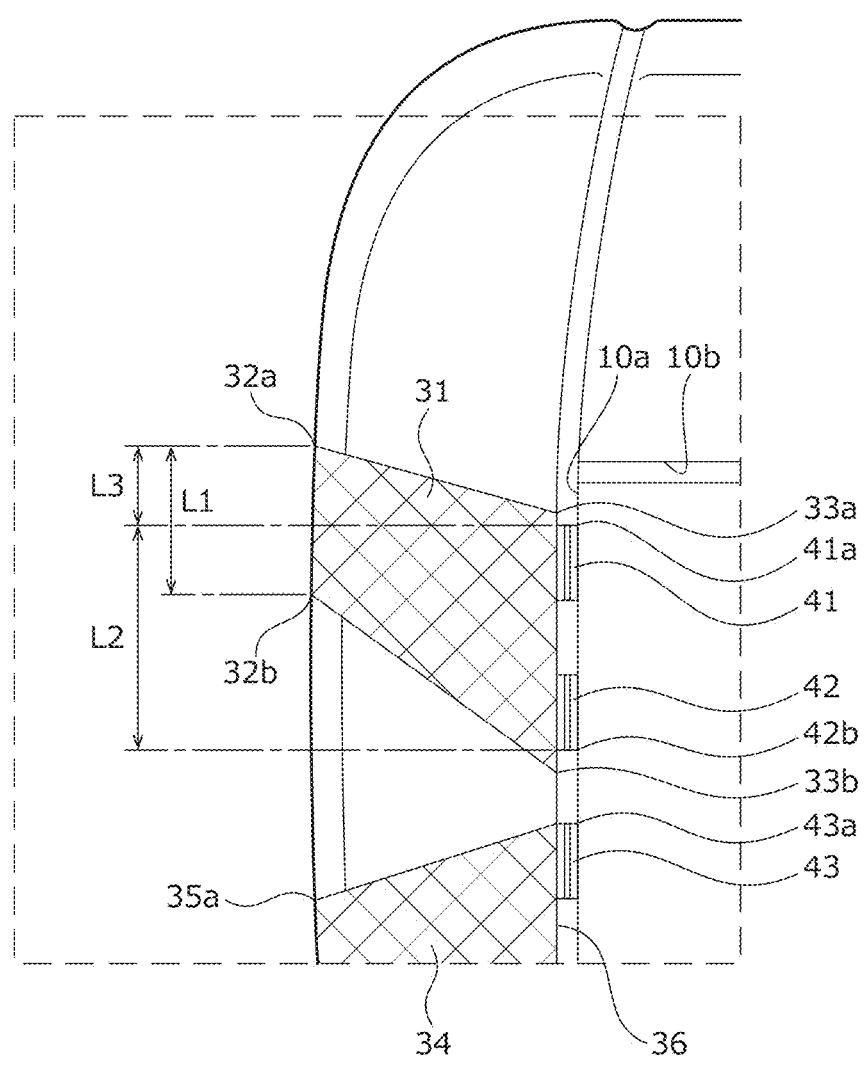
FIG. 3 is a partial enlarged view of the seat back.

As shown in FIGS. 2 and 3, a length L1 in the up to down direction from a first upper end portion 32a to a first lower end portion 32b of the chest stay cloth outer end portion 32 of the chest stay cloth 31 is shorter than a length L2 in the up to down direction from a first clip upper end portion 41a of the first clip 41 to a second clip lower end portion 42b of the second clip 42.

Therefore, when a force to cut the break portion 25a open is applied to the break portion 25a during deployment of the airbag 4a, the chest stay cloth 31 can be stably held by the first clip 41 and the second clip 42 since the length L2 from the first clip upper end portion 41a to the second clip lower end portion 42b is longer than the length L1 from the first upper end portion 32a to the first lower end portion 32b.

In this case, as shown in FIG. 3, the first upper end portion 32a of the chest stay cloth 31 is disposed above the first clip upper end portion 41a of the first clip 41. Furthermore, a length L3 in the up to down direction between the first upper end portion 32a and the first clip upper end portion 41a is shorter than the length L2 in the up to down direction from the first clip upper end portion 41a of the first clip 41 to the second clip lower end portion 42b of the second clip 42.

Therefore, an offset load from the chest stay cloth 31 can be stably supported by the first clip 41 and the second clip 42.

In addition, as shown in FIG. 3, a second upper end portion 33a of the chest stay cloth inner end portion 33 of the chest stay cloth 31 is disposed above the first clip upper end portion 41a, and a second lower end portion 33b is disposed below the second clip lower end portion 42b.

Therefore, when the clips 40 are embedded in the pad 10, even if the positions of the clips 40 are deviated due to foam molding of the pad 10, the chest stay cloth 31 can be stably held by the first clip 41 and the second clip 42.

A length L4 in the up to down direction from a third upper end portion 35a to a third lower end portion 35b of the waist stay cloth outer end portion 35 of the waist stay cloth 34 is shorter than a length L5 in the up to down direction from a third clip upper end portion 43a of the third clip 43 to a fifth clip lower end portion 45b of the fifth clip 45.

Therefore, when a force to cut the break portion 25a open is applied to the break portion 25a during deployment of the airbag 4a, the waist stay cloth 34 can be stably held by the third clip 43 and the fifth clip 45 since the length L5 from the third clip upper end portion 43a to the fifth clip lower end portion 45b is longer than the length L4 from the third upper end portion 35a to the third lower end portion 35b.

The length L4 in the up to down direction from the third upper end portion 35a to the third lower end portion 35b of the waist stay cloth outer end portion 35 of the waist stay cloth 34 is longer than the length L1 in the up to down direction from the first upper end portion 32a to the first lower end portion 32b of the chest stay cloth outer end portion 32 of the chest stay cloth 31.

Since the chest stay cloth 31 is disposed at a position in the vicinity of the gas blowing portion 4c of the inflator 4b, the chest stay cloth 31 makes it easier for the break portion 25*a* to be cut open. In addition, the length L4 of the waist stay cloth outer end portion 35 is made longer than the length L1 of the chest stay cloth outer end portion 32, so that the waist stay cloth 34 located at a position separated from the gas blowing portion 4*c* of the inflator 4*b* can make it easier for the break portion 25*a* to be cut open.

In such a manner, when the stay cloth 30 receives the inflation energy of the airbag 4*a*, the inflation energy can be received by the clips 40 at the first joint portion 24 via the nonwoven fabric. In this case, since the plurality of clips 40 are disposed at equal spacings in the up to down direction along the pull-in groove 10*a*, a load can be supported in a well-balanced manner. Incidentally, it is preferable that the spacing between the clips 40 is 40 mm to 65 mm.

In addition, the first clip 41 and the second clip 42 are contained within the vertical length range of the chest stay cloth 31, and the third clip 43, the fourth clip 44, and the fifth clip 45 are contained within the vertical length range of the waist stay cloth 34.

Furthermore, in the chest stay cloth 31, since the first upper end portion 32*a* of the chest stay cloth outer end portion 32 is disposed above the second upper end portion 33*a* of the chest stay cloth inner end portion 33, and the first lower end portion 32*b* of the chest stay cloth outer end portion 32 is disposed above the second lower end portion 33*b* of the chest stay cloth inner end portion 33, a first stay cloth is diagonally disposed as a whole.

Incidentally, on an outer stay cloth rear end portion 37*b* side, the inflation energy of the airbag 4*a* can be received by the second side portion 23.

Modification Example

Figure 5:
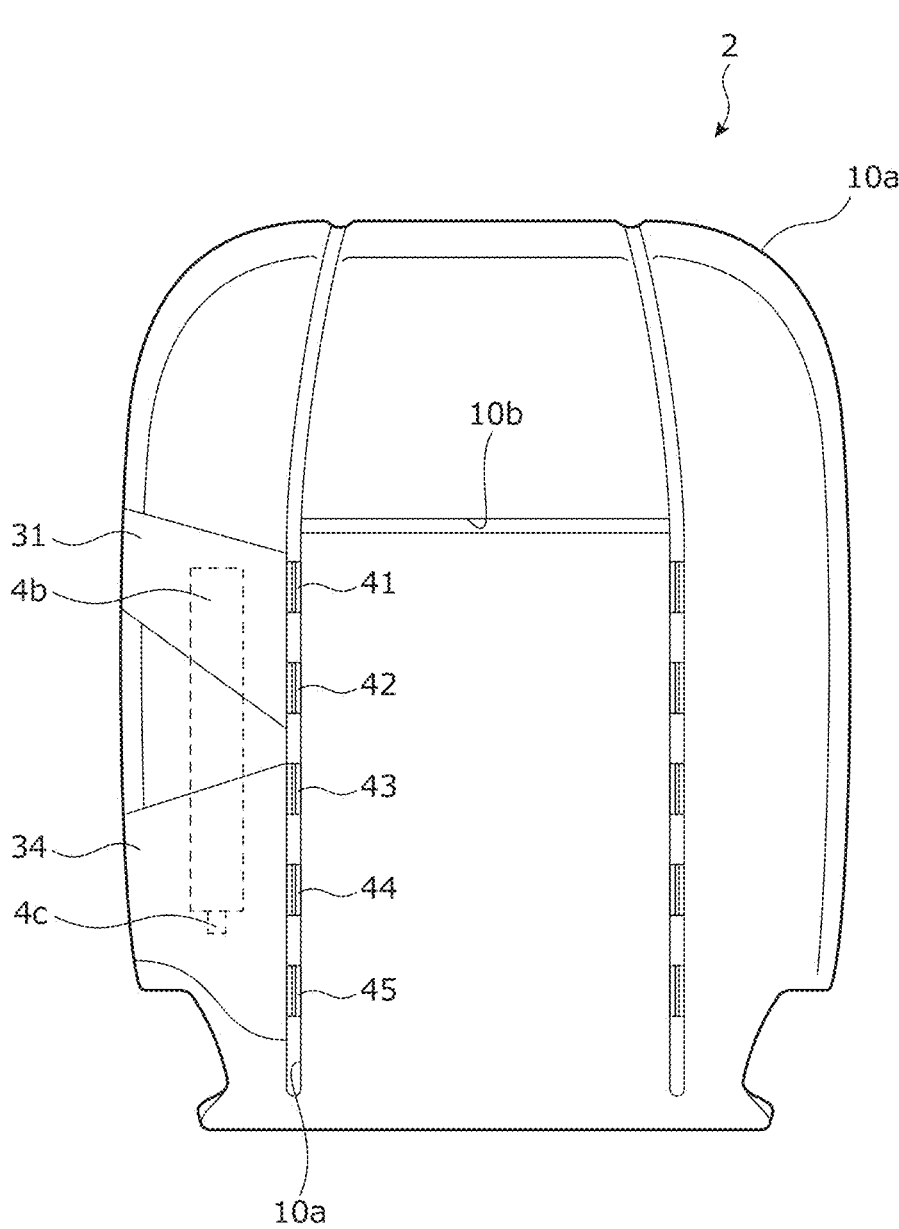
FIG. 5 is a front view of a seat back according to a modification example.

Next, a modification example of the vehicle seat S1 will be described with reference to FIG. 5. Incidentally, the description of contents that overlap with those of the vehicle seat S1 described above will be omitted.

In the vehicle seat S1 of the modification example, the gas blowing portion 4*c* of the inflator 4*b* of the airbag device 4 is disposed closer to the waist stay cloth 34 than to the chest stay cloth 31. Namely, the waist stay cloth 34 is more likely to receive a load from the airbag 4*a* than the chest stay cloth 31. For that reason, the break portion 25*a* in the vicinity of the waist stay cloth 34 is more likely to be cut open than the break portion 25*a* in the vicinity of the chest stay cloth 31.

In such a manner, since the waist stay cloth 34 is disposed at a position in the vicinity of the gas blowing portion 4*c* of the inflator 4*b*, the chest stay cloth 31 makes it easier for the break portion 25*a* to be cut open. In addition, the length L4 of the waist stay cloth outer end portion 35 is made longer than the length L1 of the chest stay cloth outer end portion 32, so that the waist stay cloth 34 located at a position close to the gas blowing portion 4*c* of the inflator 4*b* can make it even easier for the break portion 25*a* to be cut open.

Manufacturing Method

A method for manufacturing the vehicle seat S1 will be described.

First, the seat frame F (back frame) of the seat back 2 is prepared. The airbag device 4 including the airbag 4*a* and the inflator 4*b* is attached to a right side surface of the seat frame F using the fastener 4*e* such as a bolt.

Then, the pad 10 is disposed on the seat frame F to which the airbag device 4 is attached. At this time, the airbag device 4 is accommodated in the accommodation portion 10*c* of the pad 10.

The skin 20, on the inner surface of which the stay cloth 30 for guiding deployment of the airbag 4*a* is provided, is prepared. The stay cloth 30 is disposed at a position corresponding to the airbag device 4, and the skin 20 and the stay cloth 30 are stitched to attach the stay cloth 30 to the inner surface of the skin 20.

Then, the pad 10 is covered with the skin 20 to which the stay cloth 30 is attached, and the skin 20 is pulled in the pad 10 via the clips 40.

In the procedure of pulling the skin 20 in the pad 10 via the clips 40, the first joint portion 24 of the skin 20 is engaged and pulled in the clips 40 having the length in the up to down direction from the first clip upper end portion 41*a* to the second clip lower end portion 42*b* longer than the length in the up to down direction from the first upper end portion 32*a* to the first lower end portion 32*b* of the chest stay cloth outer end portion 32 of the stay cloth 30.

Incidentally, the skin 20 includes the center portion 21 covering the back center portion 2*a* that is a central portion of the pad 10 in the seat width direction; the first side portion 22 joined to the end portion 21*a* of the center portion 21 in the seat width direction; the second side portion 23 joined to the first side portion outer end portion 22*b* of the first side portion 22 in the seat width direction; the first joint portion 24 at which the center portion 21 and the first side portion 22 are joined to each other; and the second joint portion 25 at which the first side portion 22 and the second side portion 23 are joined to each other.

The first joint portion 24 is engaged with the clips 40, and is pulled in the pad 10, and the break portion 25*a* that breaks when the airbag 4*a* is deployed is formed at the second joint portion 25.

The chest stay cloth outer end portion 32 of the stay cloth 30 is joined to the first side portion 22 at the break portion 25*a*, and the chest stay cloth inner end portion 33 of the stay cloth 30 is joined to the first side portion 22 at the first joint portion 24.

Incidentally, it is preferable that the gas blowing portion 4*c* of the inflator 4*b* is disposed closer to the chest stay cloth 31 than to the waist stay cloth 34.

In addition, the gas blowing portion 4*c* of the inflator 4*b* may be disposed closer to the waist stay cloth 34 than to the chest stay cloth 31.

Incidentally, it is preferable that the first upper end portion 32*a* is disposed above the first clip upper end portion 41*a*, and it is preferable that the length in the up to down direction between the first upper end portion 32*a* and the first clip upper end portion 41*a* is shorter than the length in the up to down direction from the first clip upper end portion 41*a* to the second clip lower end portion 42*b*.

In addition, it is preferable that the second upper end portion 33*a* is disposed above the first clip upper end portion 41*a* and the second lower end portion 33*b* is disposed below the second clip lower end portion 42*b*.

In addition, it is preferable that the length in the up to down direction from the third clip upper end portion 43*a* to the fifth clip lower end portion 45*b* is longer than the length in the up to down direction from the third upper end portion 35*a* to the third lower end portion 35*b*.

In addition, it is preferable that the length in the up to down direction from the third upper end portion 35*a* to the third lower end portion 35*b* is longer than the length in the up to down direction from the first upper end portion 32*a* to the first lower end portion 32*b*.

The method for manufacturing the vehicle seat S1 described above is as follows.

A method for manufacturing a vehicle seat, including:

preparing a frame;

attaching an airbag device to the frame, the airbag device including an airbag and an inflator;

disposing a pad on the frame;

preparing a skin, on an inner surface of which a guide member for guiding a deployment of the airbag is provided;

disposing the guide member at a position corresponding to the airbag device, and covering the pad with the skin; and pulling the skin in the pad via an engagement member, wherein the skin includes a center portion covering a central portion of the pad in a seat width direction, a first side portion joined to an end portion of the center portion in the seat width direction, a second side portion joined to an outer end portion of the first side portion in the seat width direction, a first joint portion at which the center portion and the first side portion are joined to each other, and a second joint portion at which the first side portion and the second side portion are joined to each other, the first joint portion is engaged with the engagement member, and is pulled in the pad, a break portion that breaks when the airbag is deployed is formed at the second joint portion, a first end portion that is an end portion on an outer side of the guide member in the seat width direction is joined to the first side portion at the break portion, a second end portion that is an end portion on an inner side of the guide member in the seat width direction is joined to the first side portion at the first joint portion, and pulling the skin in the pad via the engagement member includes engaging and pulling the first joint portion of the skin in the engagement member having a length in an up to down direction from a first upper end to a first lower end longer than a length in the up to down direction from a first upper end portion to a first lower end portion of the first end portion of the guide member.

In the above-described embodiment, the vehicle seat used in automobiles has been described as a specific example; however, the present invention is particularly limited, and can be used for various seats such as office chairs for work, wheelchairs, and child chairs for shopping carts, in addition to two-wheeled seats for two-wheeled vehicles, vehicle seats for trains, buses, or the like, and conveyance seats for airplanes, ships, or the like.

In the present embodiment, the vehicle seat according to the present invention has been mainly described.

However, the above-described embodiment is merely one example for easy understanding of the present invention, and does not limit the present invention. The present invention can be modified and improved without departing from the concept of the present invention, and it goes without saying that the present invention includes its equivalents.

Second Embodiment

Hereinafter, a second embodiment according to the present invention will be described with reference to FIGS. 6 to 16.

The second embodiment relates to a conveyance seat in which a skin material is locked to a clip in a pull-in portion, and a method for pulling in a skin material.

In a conveyance seat, pull-in portions that are linearly recessed are provided on seating surfaces of a seat cushion and a seat back to maintain an outer shape (for example, JP 2011-069417 A and JP 2013-132328 A).

JP 2011-069417 A describes a structure in which a pull-in groove is recessed in a seating surface of a pad and a pull-in portion is formed by fixing a pull-in member, which is attached to a skin material and which extends in an extending direction of the pull-in groove, to a clip fixed to the pad at a bottom portion of the pull-in groove. The pull-in member includes a skin connecting portion (pull-in cotton cloth) attached to the skin material, and a bulging portion (suspender) connected to a lower edge of the skin connecting portion and bulging in a width direction of the pull-in groove, and the bulging portion is locked to the clip.

In addition, in JP 2013-132328 A, with regard to the same pull-in portion as described above, a pull-in member including a skin connecting portion (attachment portion) and a bulging portion that is locked to a clip is described, and the pull-in member is prevented from coming off by inserting a tip of the clip into a hole provided in the skin connecting portion.

However, in the structure described in JP 2011-069417 A, the pull-in member may deviate in the extending direction of the pull-in groove, and the outer shape of the conveyance seat may be distorted, which is a risk. In the structure described in JP 2013-132328 A, by inserting the tip of the clip into the hole, the pull-in member is not only prevented from coming off from the pull-in groove, but also prevented from deviating in the extending direction of the pull-in groove. However, there is a need to accurately coincide the position of the tip of the clip with the position of the hole, and the position of the tip of the clip may deviate from the hole due to construction errors, which is a risk. For this reason, the tip of the clip is inserted into the hole at a position deviated from the original position in the extending direction of the pull-in groove, or the tip of the clip is assembled without being inserted into the hole, and thereafter, deviates in a direction away from the hole with respect to the original position, as a result of which the outer shape of the conveyance seat may be distorted, which is a risk.

In view of the above-described background, an object of the present invention is to provide a conveyance seat including a pull-in portion that can suppress deviation of a pull-in member in an extending direction of a pull-in groove, and that allows easy position adjustment.

In order to solve the above-described problems, a conveyance seat according to one aspect of the present invention, includes a pad that is a cushion body including a pull-in groove recessed in a seating surface; a skin material stretched over the seating surface of the pad; a clip including a base plate embedded in a portion of the pad located at a bottom portion of the pull-in groove, and a locking piece which is upright from the base plate and in which a locking pawl located in the pull-in groove is formed; a pull-in member including a skin connecting portion having a strip shape extending in an extending direction of the pull-in groove, and connected to the skin material at one side edge portion, and a bulging portion provided at the other side edge portion of the skin connecting portion to bulge in a width direction of the pull-in groove, and engaged with the locking pawl of the clip; and a misalignment suppression member fixed to the skin connecting portion by sewing, and including an end surface facing the extending direction to be abuttable against the locking piece.

According to this aspect, since the end surface of the misalignment suppression member abuts against the locking piece, deviation of the pull-in member in the extending direction can be suppressed. In addition, since the misalignment suppression member is fixed to the skin connecting portion by sewing, the position of the misalignment suppression member with respect to the clip can be easily adjusted.

In the above-described aspect, the misalignment suppression member may be configured as a portion formed by folding back a longitudinal end of the pull-in member onto a main body of the pull-in member.

According to this aspect, since one component includes a portion constituting the main body of the pull-in member and a portion constituting the misalignment suppression member, an increase in the number of components can be suppressed.

In the above-described aspect, it is preferable that the bulging portion is divided between the main body and the misalignment suppression member.

According to this aspect, since the bulging portion is divided, it becomes easy to fold back the misalignment suppression member onto the main body of the pull-in member.

In the above-described aspect, the misalignment suppression member may be a separate body from the pull-in member.

According to this aspect, with a simple configuration, a pull-in portion that can suppress misalignment of the pull-in member in the extending direction of the pull-in groove, and that allows easy position adjustment can be configured. In addition, the misalignment suppression member can be provided not only for the clip disposed in the vicinity of an end portion in the extending direction of the pull-in groove, but also for the clip disposed at an intermediate portion.

In the above-described aspect, the misalignment suppression member may be made of the same material as the pull-in member.

According to this aspect, since the material of the misalignment suppression member is the same as the material of the pull-in member, the effort required to create the misalignment suppression member is small.

In the above-described aspect, the misalignment suppression member may be configured such that the misalignment suppression member is overlapped on the pull-in member from both sides in the width direction to surround the bulging portion and has an opening defining the end surface.

According to this aspect, with a simple configuration, misalignment in both directions along the extending direction can be suppressed.

One aspect of the present invention is a method for pulling in the skin material in the conveyance seat according to the above-described aspect, including: a step of fixing the misalignment suppression member to the skin connecting portion by means of sewing; and a step of locking the bulging portion to the locking pawl.

According to this aspect, since deviation of the pull-in member in the extending direction can be suppressed by the misalignment suppression member and the misalignment suppression member is fixed to the skin connecting portion by sewing, the position of the misalignment suppression member with respect to the clip can be easily adjusted.

In the above-described aspect, it is preferable that the method includes a step of providing the misalignment suppression member by folding back a longitudinal end of the pull-in member onto a main body of the pull-in member. It is preferable that the fixing step includes fixing the skin connecting portion of the misalignment suppression member to the skin connecting portion of the main body by means of sewing.

According to this aspect, since one component includes a portion constituting the main body of the pull-in member and a portion constituting the misalignment suppression member, an increase in the number of components can be suppressed.

In the above-described aspect, it is preferable that the step of providing the pull-in member includes dividing the bulging portion between the main body and the misalignment suppression member.

According to this aspect, since the bulging portion is divided, it becomes easy to fold back the misalignment suppression member onto the main body of the pull-in member.

In the above-described aspect, it is preferable that the step of providing the misalignment suppression member includes dividing the bulging portion between the main body and the misalignment suppression member.

According to this aspect, since the bulging portion is divided, it becomes easy to fold back the misalignment suppression member onto the main body of the pull-in member.

In the above-described aspect, the misalignment suppression member may be a separate body from the pull-in member.

According to this aspect, with a simple configuration, a pull-in portion that can suppress misalignment of the pull-in member in the extending direction of the pull-in groove, and that allows easy position adjustment can be configured. In addition, the misalignment suppression member can be provided not only for the clip disposed in the vicinity of an end portion in the extending direction of the pull-in groove, but also for the clip disposed at an intermediate portion.

In the above-described aspect, the method may further include a step of creating a material including the skin connecting portion and the bulging portion; and a step of creating the pull-in member and the misalignment suppression member by cutting the material. The fixing step may include fixing the skin connecting portion of the misalignment suppression member to the skin connecting portion of the pull-in member by means of sewing.

According to this aspect, since the material of the misalignment suppression member is the same as the material of the pull-in member, the effort required to create the misalignment suppression member is small.

In the above-described aspect, the misalignment suppression member may have an opening defining the end surface, and is flexible, and the fixing step may include overlapping the misalignment suppression member on the pull-in member from both sides in the width direction and fixing the misalignment suppression member to the skin connecting portion by means of sewing such that a portion of the bulging portion that is locked to the locking pawl is exposed by the opening and the misalignment suppression member surrounds the bulging portion.

According to this aspect, with a simple configuration, misalignment in both directions along the extending direction can be suppressed.

According to the above-described aspect, it is possible to provide the conveyance seat including the pull-in portion that can suppress deviation of the pull-in member in the extending direction of the pull-in groove, and that allows easy position adjustment.

According to the aspect in which the misalignment suppression member is configured by a portion formed by folding back the longitudinal end of the pull-in member onto the main body of the pull-in member, since one component includes a portion constituting the main body of the pull-in member and a portion constituting the misalignment suppression member, an increase in the number of components can be suppressed.

In this aspect, when the bulging portion is divided between the main body and the misalignment suppression member, it becomes easy to fold back the misalignment suppression member onto the main body of the pull-in member.

According to the aspect in which the misalignment suppression member is a separate body from the pull-in member, with a simple configuration, the pull-in portion that can suppress misalignment of the pull-in member and that allows easy position adjustment can be configured, and the misalignment suppression member can be provided not only for the clip disposed in the vicinity of the end portion in the extending direction of the pull-in groove, but also for the clip disposed at the intermediate portion.

In this aspect, when the misalignment suppression member is made of the same material as the pull-in member, the effort required to create the misalignment suppression member is small.

In the aspect in which the misalignment suppression member is a separate body from the pull-in member, when the misalignment suppression member has an opening defining the end surface, with a simple configuration, misalignment in both directions along the extending direction can be suppressed.

Hereinafter, a second embodiment will be described in detail with reference to the drawings.

Figure 6:
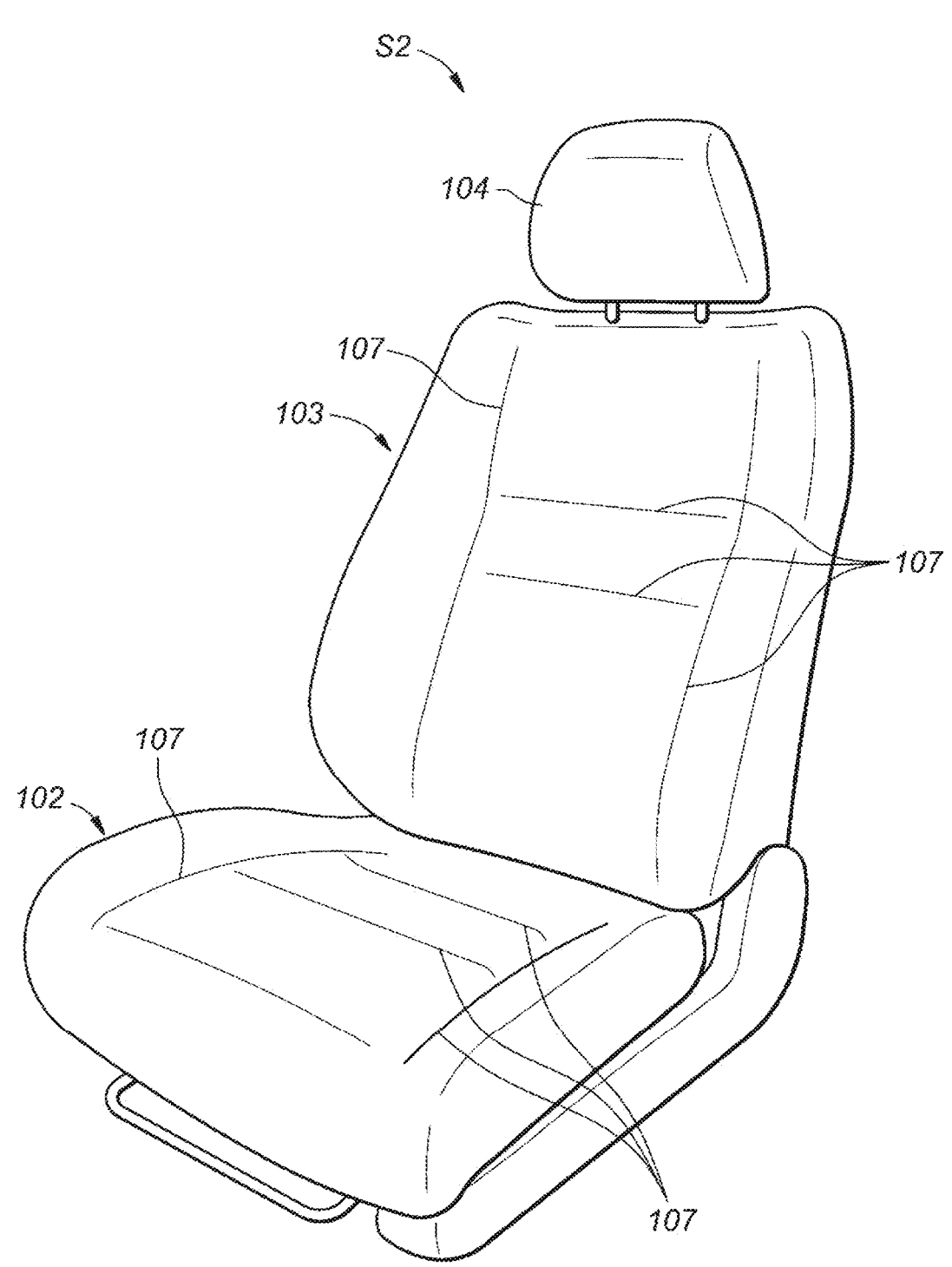
FIG. 6 is a perspective view of a seat according to a second embodiment.

FIG. 6 is a perspective view of a vehicle seat S2 (hereinafter, referred to as the "seat S2") according to the second embodiment. The seat S2 includes a seat cushion 102 supported by a vehicle body; a seat back 103 connected to the seat cushion 102; and a headrest 104 connected to the seat back 103. Each of the seat cushion 102, the seat back 103, and the headrest 104 includes a pad 105 (refer to FIG. 2) made of foamed resin such as urethane foam, and a skin material 106 covering a seating surface of the pad 105. A plurality of pull-in portions 107 that are linearly recessed are formed on the seating surfaces of the seat cushion 102 and the seat back 103 in a longitudinal direction and a lateral direction by pulling the skin material 106 in the pad 105.

Figure 7:
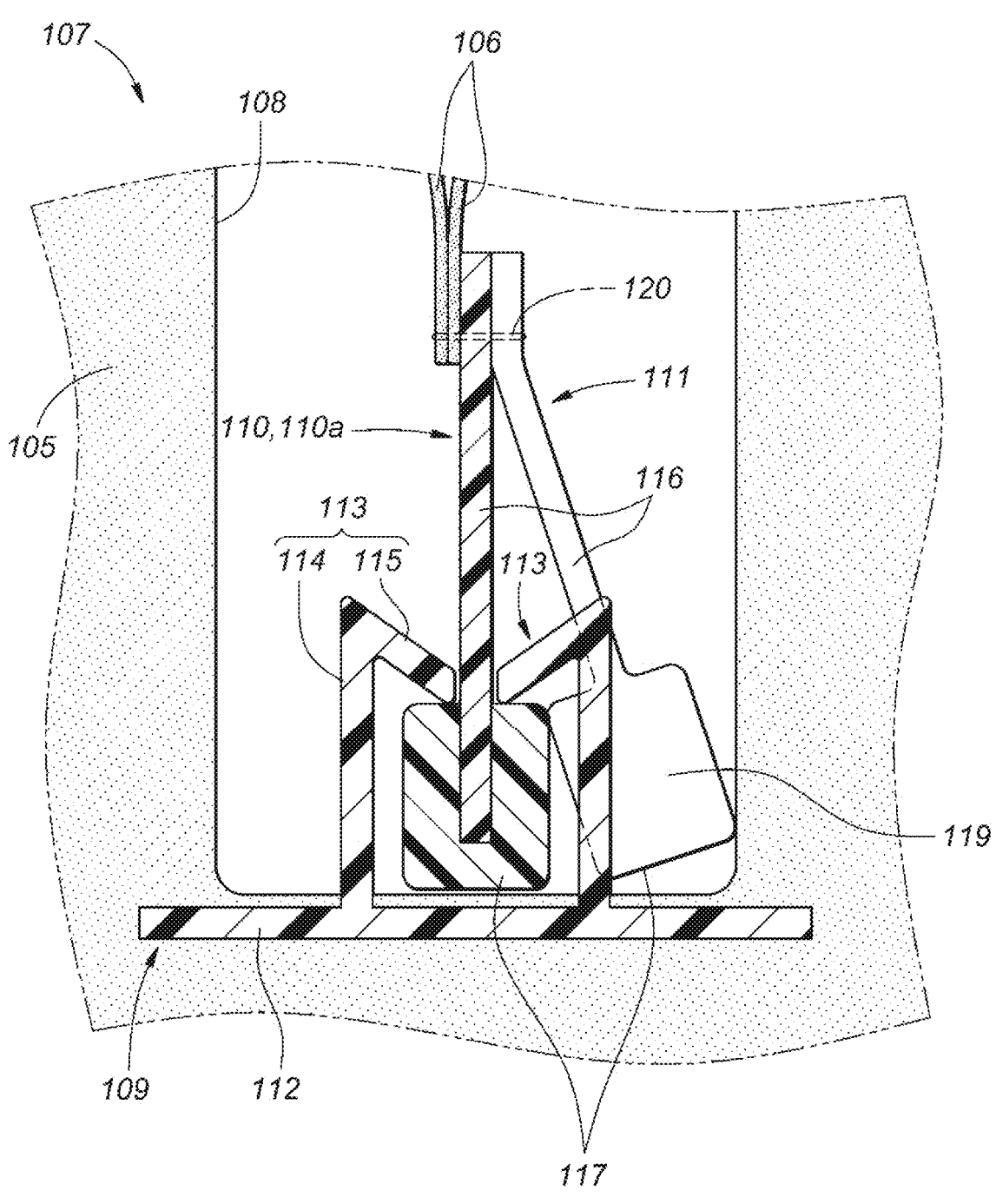
FIG. 7 is a cross-sectional view of a pull-in portion of a first example (a cross-section perpendicular to an extending direction of a pull-in groove).

FIG. 2 shows the pull-in portion 107 according to a first example of the second embodiment in a cross section perpendicular to an extending direction of the pull-in portion 107. As shown in FIGS. 6 and 7, the pull-in portion 107 of the seat S2 includes the pad 105 including a pull-in groove 108 recessed in the seating surface; the skin material 106 stretched over the seating surface of the pad 105; a clip 109 fixed to the pad 105 to be disposed in the pull-in groove 108; a pull-in member 110 connected to the skin material 106 and locked to the clip 109; and a misalignment suppression member 111 coupled to the pull-in member 110.

The pad 105 is a cushion body made of foamed resin such as urethane foam. The pull-in groove 108 is open toward the seating surface, and includes a groove extending in the longitudinal direction (the front to rear direction in the seat cushion 102 and the up to down direction in the seat back 103), and a groove extending in the lateral direction (right to left direction). The depth of the pull-in groove 108 is approximately constant, and a bottom surface of the pull-in groove 108 extends on a substantially flat plane. Hereinafter, unless otherwise specified, the term "extending direction"

and the term "width direction" indicate an extending direction and a width direction of the pull-in groove 108.

The skin material 106 is a member made of leather, fabric, or the like constituting the seating surface of the seat S2 (refer to FIG. 6).

The clip 109 is an injection-molded product that includes a base plate 112 embedded in a portion of the pad 105 located at a bottom portion of the pull-in groove 108, and a pair of locking pieces 113 upright from the base plate 112, and that is made of, for example, resin. The base plate 112 has a roughly flat plate shape, and is disposed substantially parallel to the bottom surface of the pull-in groove 108. The entirety of the base plate 112 is embedded in the pad 105; however, the base plate 112 may be disposed such that both end portions of the base plate 112 in the width direction are embedded in the pad 105 and a surface at a center portion of the base plate 112 in the width direction, on which the locking pieces 113 are provided, is exposed from the pad 105. The pair of locking pieces 113 face each other in the width direction, and include upright portions 114 that are upright from portions of the base plate 112, which are located inside inner surfaces of the pull-in groove 108 in the width direction, toward an opening of the pull-in groove 108, and locking pawls 115 formed to extend inward in the width direction such that the locking pawls 115 are inclined from tips of the upright portions 114 toward the bottom surface of the pull-in groove 108. Tips of a pair of the locking pawls 115 are separated from each other in the width direction. The locking pieces 113 are elastically deformable such that the distance between the tips of the pair of locking pawls 115 increases. Namely, the upright portions 114 are elastically deformable such that the tips thereof curve or tilt outward in the width direction, and/or the locking pawls 115 are elastically deformable such that the tips thereof curve or tilt to approach the upright portions 114.

The pull-in member 110 is disposed in the pull-in groove 108, and a longitudinal direction of the pull-in member 110 coincides with the extending direction of the pull-in groove 108. The pull-in member 110 includes a skin connecting portion 116 having a strip shape and extending along the longitudinal direction of the pull-in member 110, and a bulging portion 117 extending along the longitudinal direction of the pull-in member 110 and connected to a side edge of the skin connecting portion 116. The skin connecting portion 116 is formed from a sewable material such as nonwoven fabric or woven fabric. The skin connecting portion 116 is connected to the skin material 106 at the side edge portion located on an opening side of the pull-in groove 108 by sewing, and is connected to the bulging portion 117 at the side edge located on a bottom surface side of the pull-in groove 108. The bulging portion 117 has a shape that is bulged in the width direction with respect to the skin connecting portion 116, and is locked to the locking pawls 115. Therefore, the clip 109 is configured such that the distance between the tips of the pair of locking pawls 115 can be narrower than a width of the bulging portion 117 before elastic deformation and can become larger than or equal to the width of the bulging portion 117 during elastic deformation. The bulging portion 117 is made of resin, and is formed by injection molding. The bulging portion 117 is connected to the skin connecting portion 116 by performing injection molding in a state where the skin connecting portion 116 is installed in a cavity of a mold. Incidentally, the pull-in member 110 may be made of resin in which the skin connecting portion 116 and the bulging portion 117 are integrally molded.

Figure 8:
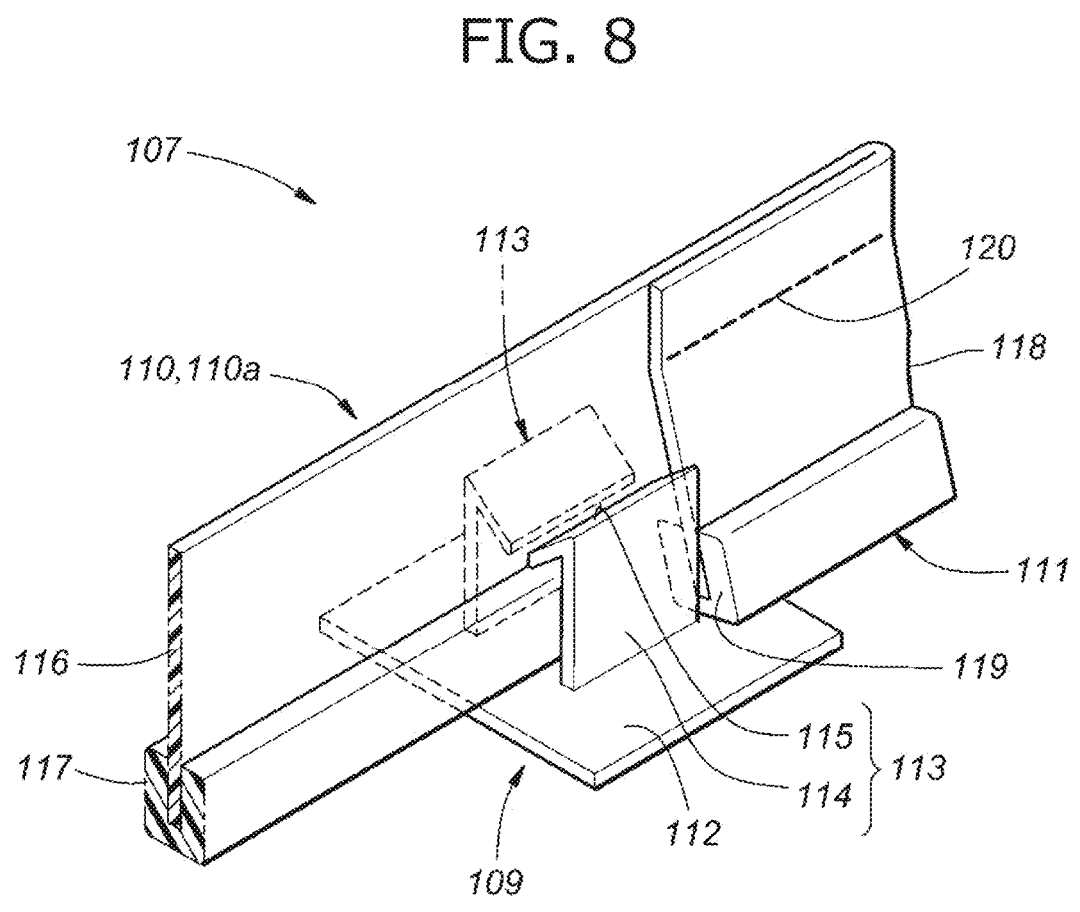

FIG. 8 is a perspective view showing the pull-in member 110 and the misalignment suppression member 111. As shown in FIGS. 7 and 8, the misalignment suppression member 111 is configured by a portion formed by folding back a longitudinal end of the pull-in member 110 onto a main body 110*a* (a portion including a portion that engages with the clip 109, and extending on a substantially flat plane) of the pull-in member 110. The bulging portion 117 of the misalignment suppression member 111 is disposed adjacent to the bulging portion 117 of the main body 110*a* of the pull-in member 110. The skin connecting portion 116 of the misalignment suppression member 111 is fixed to the skin connecting portion 116 of the main body 110*a* of the pull-in member 110 at the side edge portion located on the opening side of the pull-in groove 108 by sewing. In order to make it easier to fold back the longitudinal end of the pull-in member 110 as the misalignment suppression member 111, it is preferable that a cutout portion 118 is provided between the main body 110*a* of the pull-in member 110 and the misalignment suppression member 111 at the side edge portion of the pull-in member 110 on the side where the bulging portion 117 is provided. The bulging portion 117 is divided into a main body 110*a* side and a misalignment suppression member 111 side by the cutout portion 118. Instead of the cutout portion 118, a slit (not shown) may be provided by cutting the side edge portion of the pull-in member 110 on the side where the bulging portion 117 is provided, thereby dividing the bulging portion 117 into the main body 110*a* side and the misalignment suppression member 111 side.

Inside the pull-in groove 108 that accommodates the pull-in member 110 of interest, the locking pieces 113 of the clip 109 disposed closest to the misalignment suppression member 111 are located closer to a center side in the extending direction than the misalignment suppression member 111, and an end surface 119 of the misalignment suppression member 111 facing the center side in the extending direction is abuttable against side surfaces of the locking pieces 113 in the extending direction. The end surface 119 may actually abut against the side surfaces of the locking pieces 113, or there may be a gap between the end surface 119 and the side surfaces of the locking pieces 113. When a gap is provided, a distance between the end surface 119 and the side surfaces of the locking pieces 113 is smaller than or equal to an allowable length for misalignment of the pull-in member 110 in the extending direction. The end surface 119 of the misalignment suppression member 111 is abuttable against the side surfaces of the locking pieces 113 at the skin connecting portion 116 or the bulging portion 117 or both the skin connecting portion 116 and the bulging portion 117.

A method for pulling the skin material 106 in the pull-in portion 107 will be described.

A worker forms the pad 105 in which the clip 109 is embedded, by attaching the clip 109 in a mold (not shown), causing a foamed resin material to be injected into the mold, and causing the foamed resin material to be foamed and hardened.

The worker fixes the pull-in member 110 to the skin material 106 by means of sewing (reference sign 120 indicates a sewing thread). The misalignment suppression member 111 is fixed to the skin material 106 by sewing, together with the main body 110*a* of the pull-in member 110. Incidentally, after the main body 110*a* of the pull-in member 110 is fixed to the skin material 106 by sewing, the misalignment suppression member 111 may be fixed, by sewing, to a portion at which the skin material 106 and the skin connecting portion 116 of the main body 110*a* of the pull-in member 110 overlap each other, or after the main body 110*a* of the pull-in member 110 is fixed to the skin material 106 by sewing, the misalignment suppression member 111 may be fixed to the skin connecting portion 116 of the main body 110*a* of the pull-in member 110 by sewing without being fixed to the skin material 106, or the misalignment suppression member 111 may be first fixed to the skin connecting portion 116 of the main body 110*a* of the pull-in member 110 by sewing, and thereafter, may be fixed to the skin material 106 by sewing, together with the main body 110*a*.

Next, the worker inserts the pull-in member 110 into the pull-in groove 108 from the bulging portion 117, and presses the bulging portion 117 against the pair of locking pawls 115 of the clip 109, so that the locking pieces 113 of the clip 109 are elastically deformed such that the distance between the tips of the pair of locking pawls 115 increases, and the bulging portion 117 is passed between the tips of the pair of locking pawls 115. After the bulging portion 117 passes between the tips of the pair of locking pawls 115, the locking pieces 113 return to the original shape, so that the bulging portion 117 is locked to the locking pawls 115.

Actions and effects of the first example of the second embodiment will be described with reference to FIGS. 6 to 8. Since the bulging portion 117 is locked to the locking pawls 115, the pull-in member 110 is prevented from coming off from the pull-in groove 108, and the pull-in portion 107 is formed.

Since the end surface 119 of the misalignment suppression member 111 abuts against the side surfaces of the locking pieces 113 in the extending direction, misalignment of the pull-in member 110 in the extending direction toward a direction in which the end surface 119 faces is suppressed. For this reason, the distortion of the appearance of the seat S2 due to misalignment of the pull-in member 110 can be suppressed.

Since the means for fixing the misalignment suppression member 111 to the main body 110*a* of the pull-in member 110 is sewing, the sewing thread 120 can be untied and re-sewn, and it is easy to adjust the position of the misalignment suppression member 111 with respect to the clip 109. In addition, when the misalignment suppression member 111 is fixed to the main body 110*a* of the pull-in member 110 after the main body 110*a* of the pull-in member 110 is fixed to the skin material 106, the position of the misalignment suppression member 111 with respect to the clip 109 can be adjusted, and then the misalignment suppression member 111 can be fixed to the main body 110*a* of the pull-in member 110, so that it is easy to adjust the position of the misalignment suppression member 111 with respect to the clip 109. In addition, when the end surface 119 of the misalignment suppression member 111 passes beyond the side surfaces of the locking pieces 113 of the clip 109 and is located close to the center in the extending direction, the position of the misalignment suppression member 111 can also be adjusted by cutting off the portion passing beyond the side surfaces.

Figure 9:
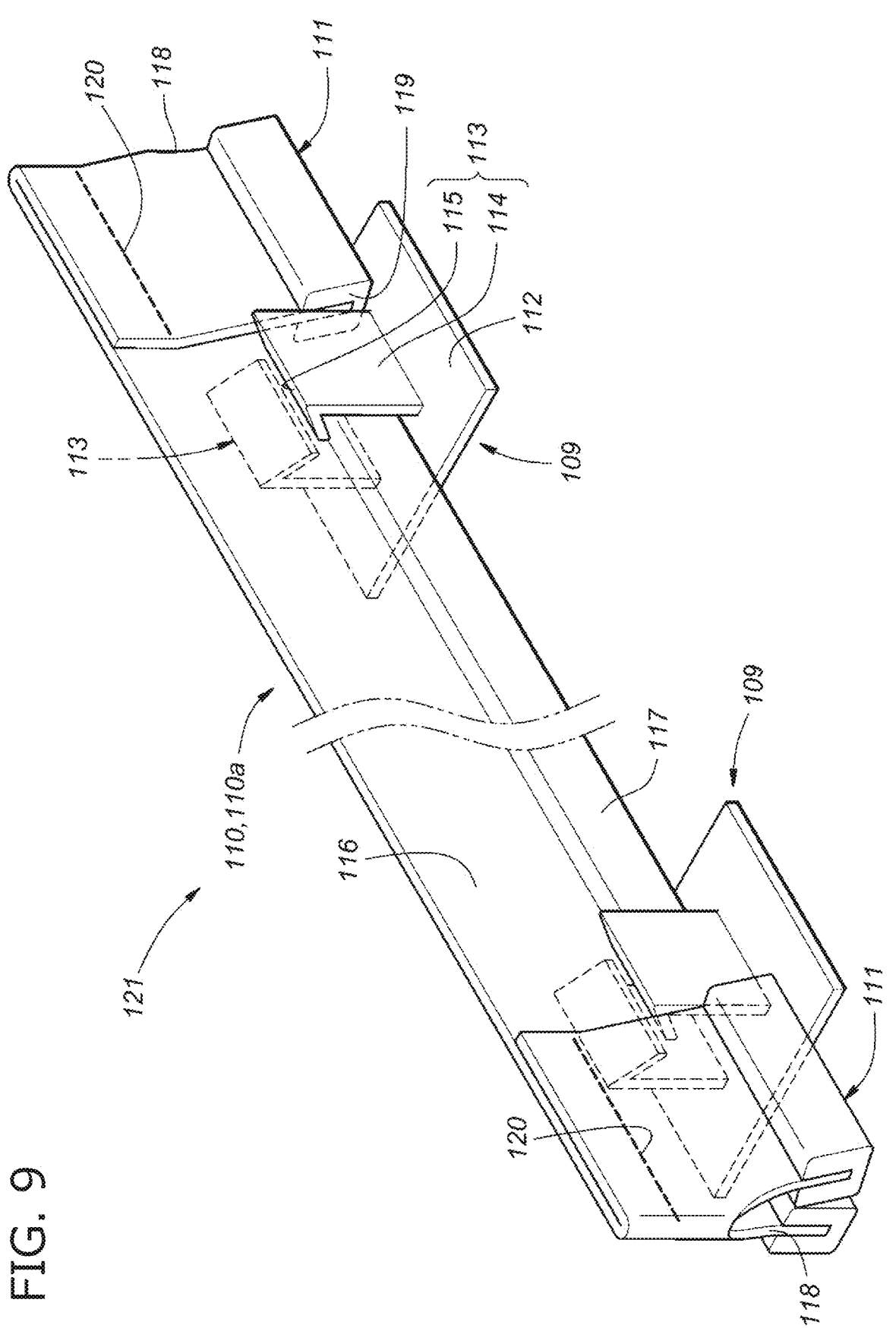
FIG. 9 is a perspective view of a pull-in member and a misalignment suppression member of a second example.

Next, a second example according to the present invention will be described with reference to FIG. 9. In the following description, configurations common to the first example are denoted by the same reference signs, and description thereof will be omitted. Incidentally, in the description of the third and subsequent examples as well, configurations common to the examples that have been already described are denoted by the same reference signs, and description thereof will be omitted. FIG. 9 is a perspective view showing the pull-in member 110 and the misalignment suppression member 111 in a pull-in portion 121.

In the first example, the misalignment suppression member 111 is provided only at one end portion of the pull-in member 110 in the longitudinal direction; however, in the pull-in portion 121 of the second example, the misalignment suppression members 111 are provided at both end portions of the pull-in member 110 in the longitudinal direction. For this reason, at one end portion in the longitudinal direction, the end surface 119 of the misalignment suppression member 111 is abuttable against the side surfaces of the locking pieces 113 of the clip 109 in a direction opposite to the other end portion. Therefore, misalignment of the pull-in member 110 is suppressed in both directions along the extending direction of the pull-in groove 108. The other actions and effects are the same as those of the first example.

Figure 10:
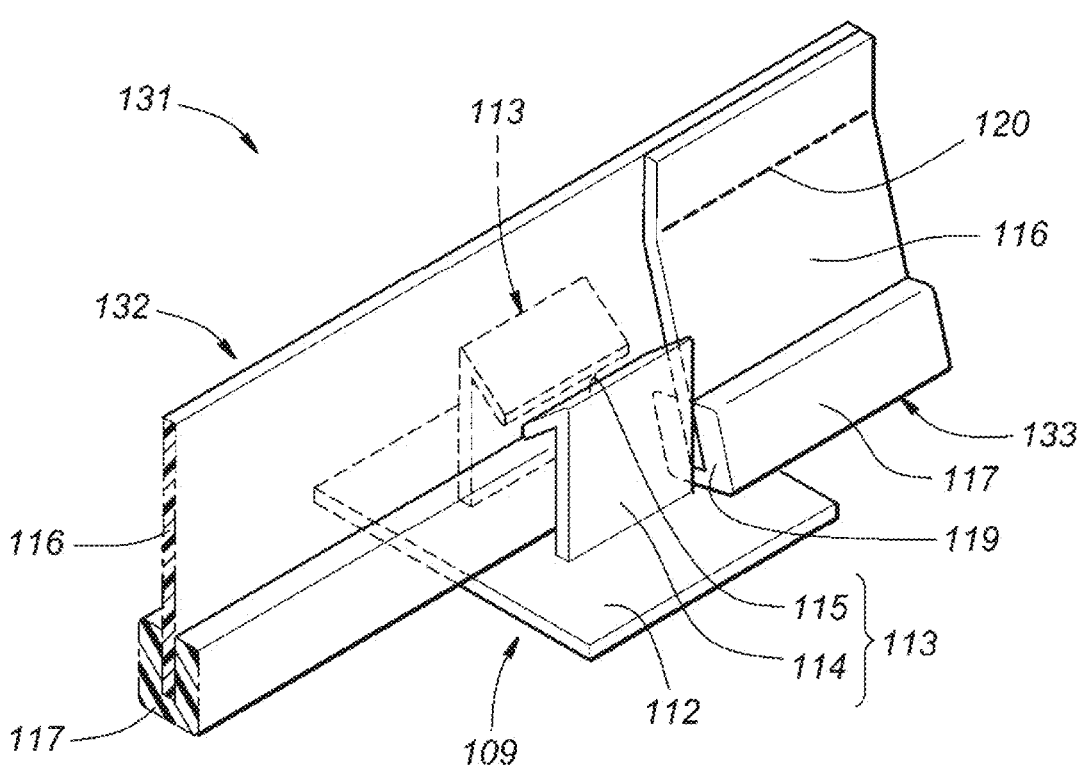
FIG. 10 is a perspective view of a pull-in member and a misalignment suppression member of a third example.

A third example will be described with reference to FIG. 10. FIG. 10 is a perspective view showing a pull-in member 132 and a misalignment suppression member 133 in a pull-in portion 131. The pull-in portion 131 according to the third example differs from the first example in that the pull-in member 132 and the misalignment suppression member 133 are separate bodies from each other.

The misalignment suppression member 133 is made of the same material as the pull-in member 132. The material for creating the pull-in member 132 and the misalignment suppression member 133 is created by the same method as a method for creating the pull-in member 110 (refer to FIG. 8) described in the first example. Therefore, the material includes the skin connecting portion 116 and the bulging portion 117. A length of the material is set to be longer than a combined length of the pull-in member 132 and the misalignment suppression member 133 in the longitudinal direction. The pull-in member 132 and the misalignment suppression member 133 are created by cutting the material along a plane perpendicular to the extending direction.

Since the material of the misalignment suppression member 133 is the same as the material of the pull-in member 132, the effort required to create the misalignment suppression member 133 is small. In addition, the third example has the same actions and effects as the first example, except for the cutout portion 118 (refer to FIG. 8). In addition, similarly to the second example, the misalignment suppression member 133 may be attached not only to one end portion of the pull-in member 132 in the longitudinal direction, but also to both end portions. In addition, the misalignment suppression member 133 may be provided not only at a position where the misalignment suppression member 133 abuts against the clip 109 provided at an end portion in the extending direction, but also at a position where the misalignment suppression member 133 abuts against the clip 109 provided at an intermediate portion in the extending direction. In the shown example, the misalignment suppression member 133 is provided on only one side of one clip 109 in the extending direction; however, the misalignment suppression members 133 may be provided on both sides thereof. One misalignment suppression member 133 disposed between two clips 109 may be abuttable against the corresponding clips 109 at both end surfaces 119 in the extending direction.

Figure 11:
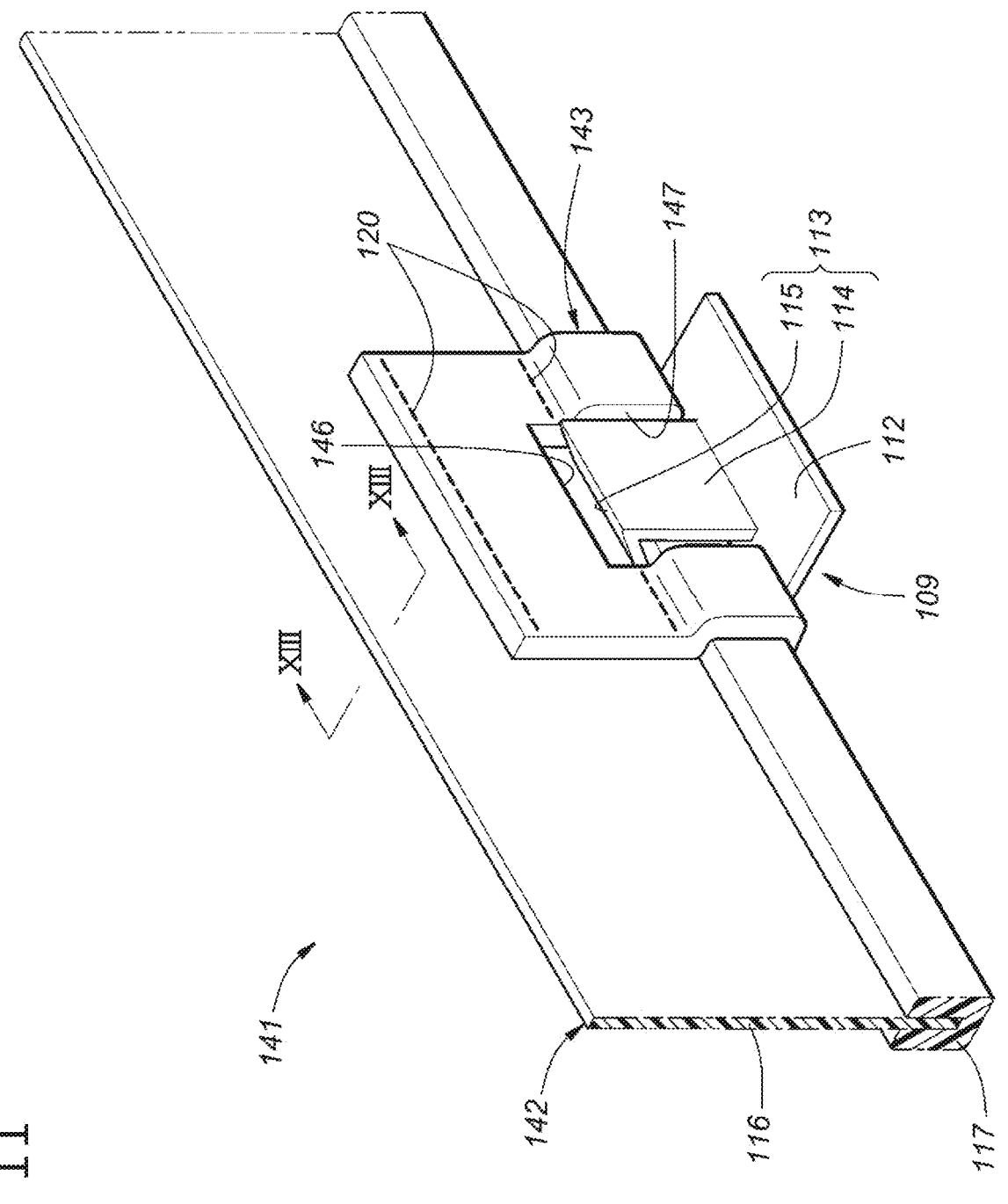
FIG. 11 is a perspective view of a pull-in member and a misalignment suppression member of a fourth example.
Figure 12:
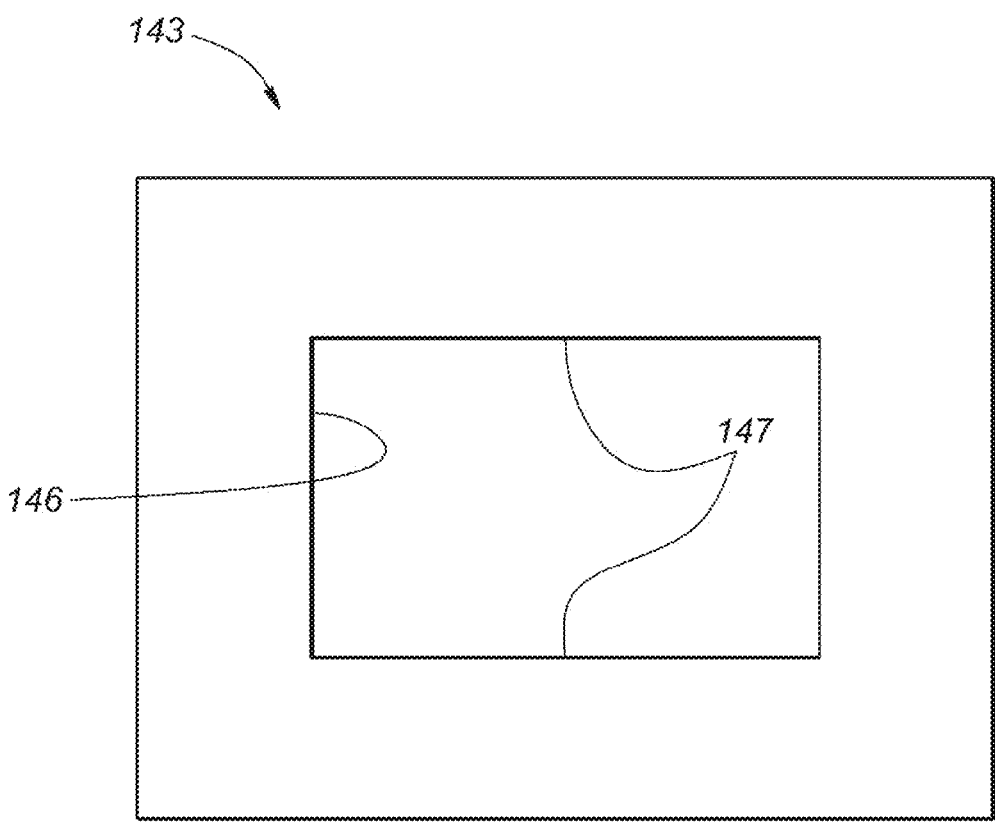
FIG. 12 is an unfolded view of the misalignment suppression member of the fourth example.
Figure 13:
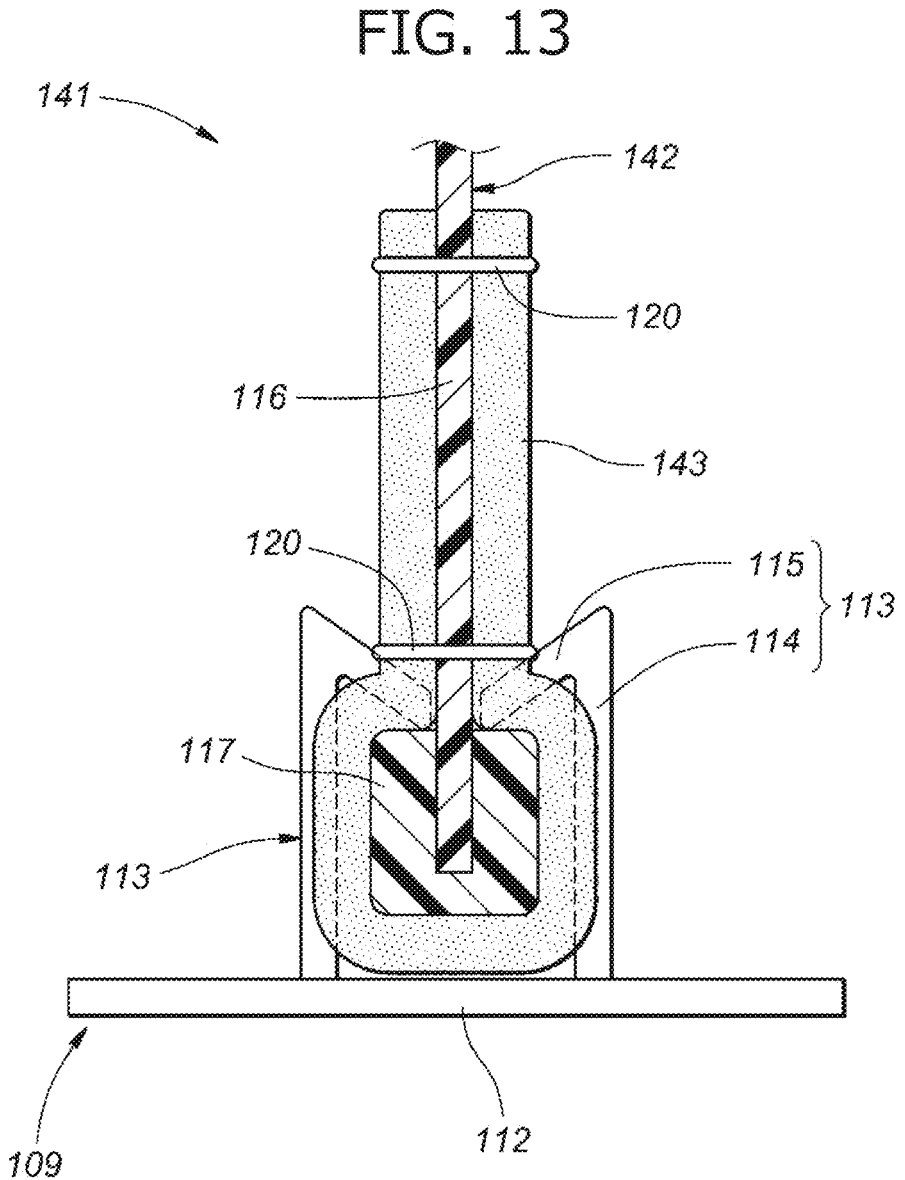
FIG. 13 is a cross-sectional view taken along line XIII-XIII in FIG. 11.
Figure 14:
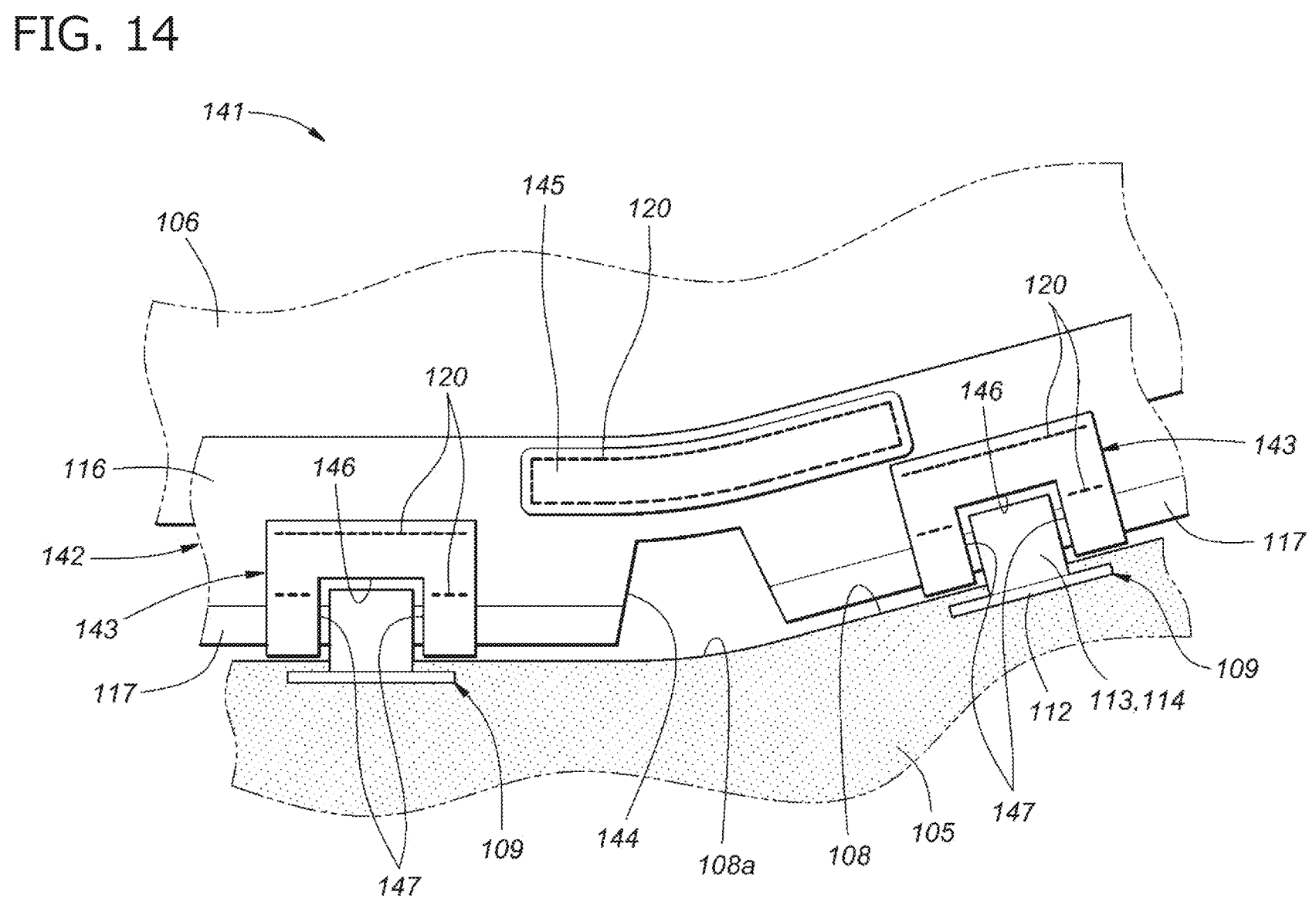

A fourth example will be described with reference to FIGS. 11 to 14. FIG. 11 is a perspective view showing a pull-in member 142 and a misalignment suppression member 143 in a pull-in portion 141, FIG. 7 is an unfolded view showing the misalignment suppression member 143, FIG. 13 is a cross-sectional view showing a state where the pull-in member 142 is attached to the clip 109, and FIG. 14 is a partial cross-sectional side view showing a state where the pull-in member 142 is attached to the clip 109. The fourth example differs from the third example in the pull-in member 142 and the misalignment suppression member 143.

As shown in FIG. 14, the pull-in member 142 is common with the pull-in member 132 of the third example (refer to FIG. 10) in that the pull-in member 142 includes the skin connecting portion 116 and the bulging portion 117, but differs in that a cutout portion 144 is provided at a bent portion 108a at which the bottom surface of the pull-in groove 108 is bent. The cutout portion 144 is provided from a bulging portion 117 side, divides the bulging portion 117, and cuts out the skin connecting portion 116 in a recessed shape. The pull-in member 142 includes a plate 145 provided closer to a seating surface side than the cutout portion 144. The plate 145 is fixed to one surface of the skin connecting portion 116 by sewing. Both end portions of the plate 145 in the extending direction are located outside in the extending direction with respect to both end portions of the cutout portion 144 in the extending direction. It is preferable that in a portion at which the bottom surface of the pull-in groove 108 is inclined with respect to a horizontal plane, when viewed in a depth direction of the pull-in groove 108, the end portion of the plate 145 overlaps an end portion of the misalignment suppression member 143 in the extending direction. It is preferable that the bending rigidity of the plate 145 is higher than the bending rigidity of the skin connecting portion 116, and for example, the plate 145 is made of a sewable resin.

As shown in FIGS. 11 to 14, the misalignment suppression member 143 is a sheet-shaped member that is flexible, and has an opening 146 penetrating therethrough in a thickness direction. In a state where the misalignment suppression member 143 is unfolded, the opening 146 has a rectangular shape, and it is preferable that the outer shape of the misalignment suppression member 143 also has a rectangular shape having sides parallel to sides of the opening 146. The misalignment suppression member 143 has a predetermined thickness, and end surfaces 147 are formed at an inner peripheral portion of the misalignment suppression member 143 that defines the opening 146. It is preferable that the misalignment suppression member 143 has a larger thickness than the skin connecting portion 116, and for example, the misalignment suppression member 143 is made of felt.

The misalignment suppression member 143 is overlapped on the bulging portion 117 of the pull-in member 132 and the skin connecting portion 116 from both sides in the width direction (front to back direction of the skin connecting portion 116) and is fixed to the skin connecting portion 116 by sewing such that a portion of the bulging portion 117 of the pull-in member 132 that is locked to the locking pawls 115 is exposed by the opening 146 and the misalignment suppression member 143 surrounds a portion adjacent to the portion of the bulging portion 117 that is exposed by the opening 146. For this reason, the end surfaces 147 of the misalignment suppression member 143 that face each other in the extending direction face the side surfaces of the locking pieces 113 of the clip 109 in the extending direction, and the end surfaces 147 abut against the locking pieces 113 due to a slight displacement of the pull-in member 132 in the extending direction. Incidentally, at the original position, one or both of the end surfaces 147 may be abut against the locking pieces 113.

The work of creating the cutout portion 144, the work of attaching the plate 145 to the pull-in member 142, and the work of attaching the misalignment suppression member 143 to the pull-in member 142 are performed after the misalignment suppression member 143 is attached to the skin material 106, in order to make it easier to adjust the positions thereof. Incidentally, in order to improve workability, these works may be performed before the misalignment suppression member 143 is attached to the skin material 106.

By providing the cutout portion 144, it is made easier to deform the pull-in member 142 in conformation with the shape of the pull-in groove 108.

Since the plate 145 compensates for a reduction in the bending rigidity of the pull-in member 142 due to the bulging portion 117 being cut by the cutout portion 144, deviation of two bulging portions 117, which face each other with the cutout portion 144 sandwiched therebetween, in a direction in which the two bulging portions 117 approach each other is suppressed.

Since the end surfaces 147 of the misalignment suppression member 143 that define the opening 146 is abuttable against the locking pieces 113 of the clip 109, misalignment of the pull-in member 142 in the extending direction is suppressed. The misalignment suppression member 143 can be applied to both the clip 109 provided at the end portion in the extending direction and the clip 109 provided at the intermediate portion.

Figure 15:
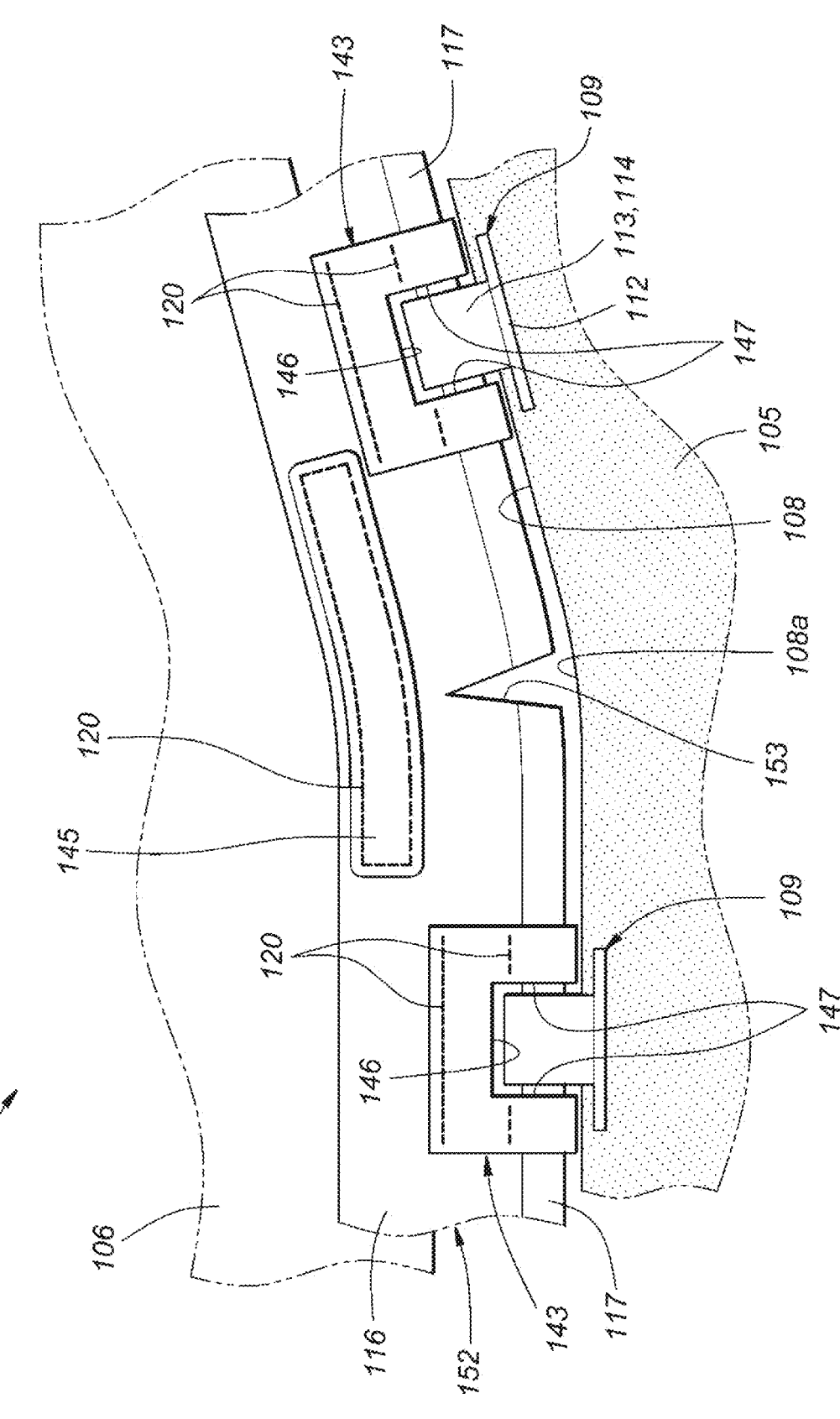
FIG. 15 is a partial cross-sectional side view of a pull-in portion of a fifth example (a cross section of a pull-in groove perpendicular to a width direction).

A fifth example will be described with reference to FIG. 15. FIG. 15 is a partial cross-sectional side view of a pull-in portion 151. The fifth example differs from the fourth example in that, whereas the pull-in member 142 in the fourth example includes the cutout portion 144 (refer to FIG. 14), the fifth example includes a slit 153 instead of the cutout portion 144.

The slit 153 is provided by cutting a pull-in member 152 from the bulging portion 117 at a position corresponding to the bent portion 108*a*. The slit 153 divides the bulging portion 117, and reaches the vicinity of a portion of the skin connecting portion 116 to which the plate 145 is attached. The fifth example has the same actions and effects as the fourth example.

Figure 16:
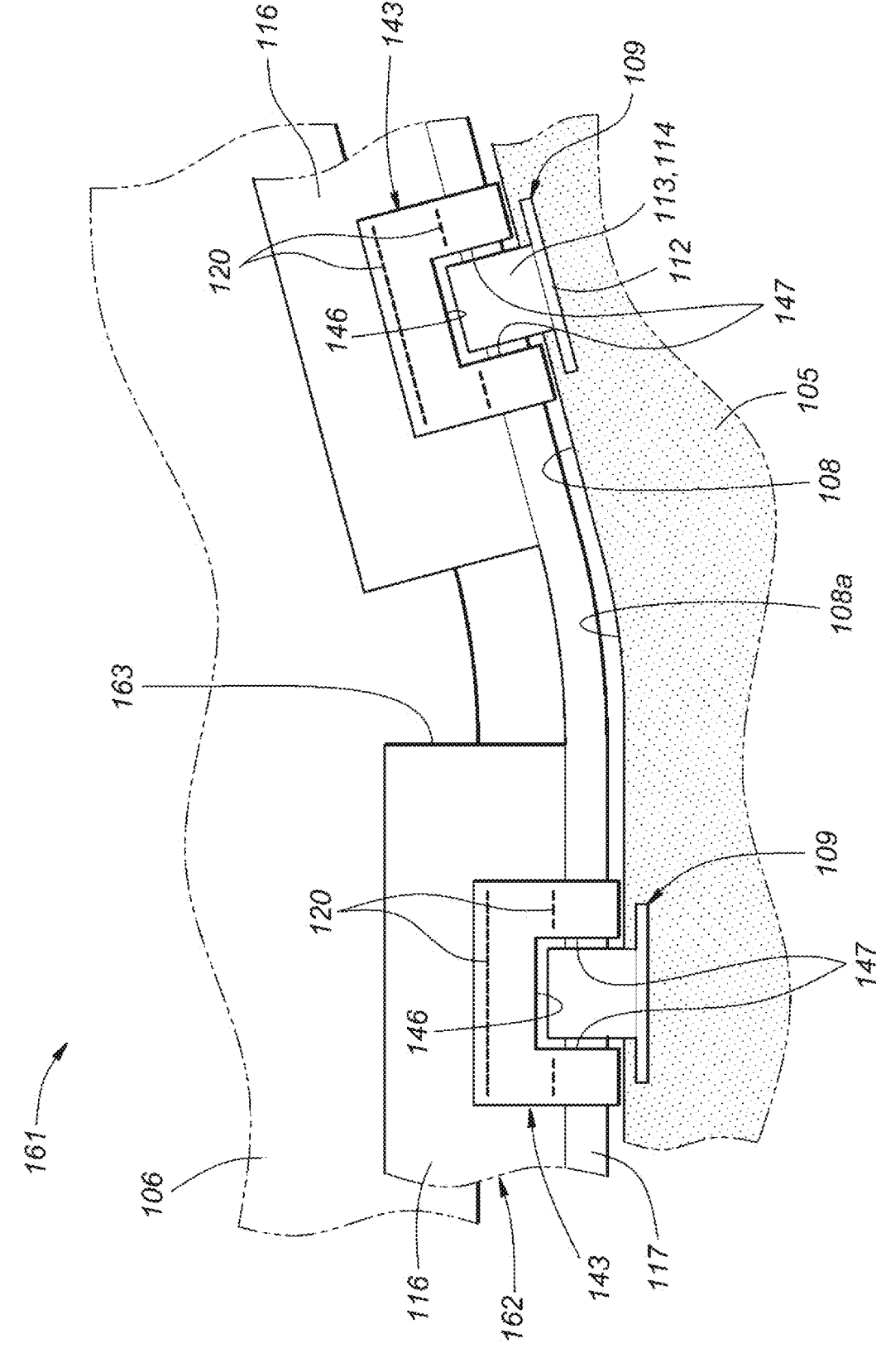
FIG. 16 is a partial cross-sectional side view of a pull-in portion of a sixth example (a cross section of a pull-in groove perpendicular to the width direction).

A sixth example will be described with reference to FIG. 16. FIG. 16 is a partial cross-sectional side view of a pull-in portion 161. The sixth example differs from the fourth example in that, whereas the cutout portion 144 of the pull-in member 142 in the fourth example is provided from the bottom surface side of the pull-in groove 108 (refer to FIG. 14), a cutout portion 163 of a pull-in member 162 is provided from a side edge portion of the skin connecting portion 116 that is connected to the skin material 106, and in that the plate 145 (refer to FIG. 14) is provided.

The cutout portion 163 cuts out the skin connecting portion 116 from the side edge portion of the skin connecting portion 116, the side edge portion being connected to the skin material 106, to the bulging portion 117 at a position corresponding to the bent portion 108*a*. By providing the cutout portion 163, it is made easier to deform the pull-in member 162 in conformation with the shape of the pull-in groove 108. Unlike the fourth example, since the bulging portion 117 having higher bending rigidity than the skin connecting portion 116 exists at a position corresponding to the bent portion 108*a*, deviation of portions of the bulging portion 117, which engages with two clips 109 adjacent to each other with the cutout portion 163 sandwiched therebetween, in a direction in which the portions approach each other is suppressed.

Supplementary notes on the second embodiment will be provided as follows.

Supplementary Note 1

A conveyance seat, comprising:
a pad that is a cushion body including a pull-in groove recessed in a seating surface;
a skin material stretched over the seating surface of the pad;
a clip including a base plate embedded in a portion of the pad located at a bottom portion of the pull-in groove, and a locking piece which is upright from the base plate and in which a locking pawl located in the pull-in groove is formed;
a pull-in member including a skin connecting portion having a strip shape extending in an extending direction of the pull-in groove, and connected to the skin material at one side edge portion, and a bulging portion provided at the other side edge portion of the skin connecting portion to bulge in a width direction of the pull-in groove, and engaged with the locking pawl of the clip; and
a misalignment suppression member fixed to the skin connecting portion by sewing, and including an end surface facing the extending direction to be abuttable against the locking piece.

Supplementary Note 2

The conveyance seat according to Supplementary Note 1, wherein the misalignment suppression member is configured as a portion formed by folding back a longitudinal end of the pull-in member onto a main body of the pull-in member.

Supplementary Note 3

The conveyance seat according to Supplementary Note 2, wherein the bulging portion is divided between the main body and the misalignment suppression member.

Supplementary Note 4

The conveyance seat according to Supplementary Note 1, wherein the misalignment suppression member is a separate body from the pull-in member.

Supplementary Note 5

The conveyance seat according to Supplementary Note 4, wherein the misalignment suppression member is made of the same material as the pull-in member.

Supplementary Note 6

The conveyance seat according to Supplementary Note 4, wherein the misalignment suppression member is configured such that the misalignment suppression member is overlapped on the pull-in member from both sides in the width direction to surround the bulging portion and has an opening defining the end surface.

Supplementary Note 7

A method for pulling in the skin material in the conveyance seat according to Supplementary Note 1, comprising:

a step of fixing the misalignment suppression member to the skin connecting portion by means of sewing; and
a step of locking the bulging portion to the locking pawl.

Supplementary Note 8

The method according to Supplementary Note 7, further comprising:
a step of providing the misalignment suppression member by folding back a longitudinal end of the pull-in member onto a main body of the pull-in member,
wherein the fixing step includes fixing the skin connecting portion of the misalignment suppression member to the skin connecting portion of the main body by means of sewing.

Supplementary Note 9

The method according to Supplementary Note 8,
wherein the step of providing the misalignment suppression member includes dividing the bulging portion between the main body and the misalignment suppression member.

Supplementary Note 10

The method according to Supplementary Note 7,
wherein the misalignment suppression member is a separate body from the pull-in member.

Supplementary Note 11

The method according to Supplementary Note 10, further comprising:
step of creating a material including the skin connecting portion and the bulging portion; and
a step of creating the pull-in member and the misalignment suppression member by cutting the material,
wherein the fixing step includes fixing the skin connecting portion of the misalignment suppression member to the skin connecting portion of the pull-in member by means of sewing.

Supplementary Note 12

The method according to Supplementary Note 10,
wherein the misalignment suppression member has an opening defining the end surface, and is flexible, and
the fixing step includes overlapping the misalignment suppression member on the pull-in member from both sides in the width direction and fixing the misalignment suppression member to the skin connecting portion by means of sewing such that a portion of the bulging portion that is locked to the locking pawl is exposed by the opening and the misalignment suppression member surrounds the bulging portion.

REFERENCE SIGNS LIST

S1, S2: vehicle seat (conveyance seat)
F: seat frame (frame)
1: seat cushion
2: seat back
2a: back center portion
2b: bolster portion
3: headrest
4: airbag device

26

4a: airbag
4b: inflator
4c: gas blowing portion
4d: casing
4e: fastener
10: pad
10a: pull-in groove
10b: lateral pull-in groove
10c: accommodation portion
10d: slit
20: skin
21: center portion
21a: end portion of center portion
22: first side portion
22a: first side portion inner end portion
22b: first side portion outer end portion (outer end portion)
23: second side portion
23a: front end portion
23b: rear end portion
24: first joint portion
25: second joint portion
25a: break portion
26: skin back portion
27: linear fastener
30: stay cloth
31: chest stay cloth (guide member, first guide member)
32: chest stay cloth outer end portion (first end portion)
32a: first upper end portion
32b: first lower end portion
33: chest stay cloth inner end portion (second end portion)
33a: second upper end portion
33b: second lower end portion
34: waist stay cloth (second guide member)
35: waist stay cloth outer end portion
35a: third upper end portion
35b: third lower end portion
36: waist stay cloth inner end portion
37: outer stay cloth
37a: outer stay cloth front end portion
37b: outer stay cloth rear end portion
40: clip
40a: holding portion
41: first clip (engagement member, first engagement member)
41a: first clip upper end portion (first upper end)
42: second clip (engagement member, first engagement member)
42b: second clip lower end portion (first lower end)
43: third clip (second engagement member, upper engagement member)
43a: third clip upper end portion (second upper end)
44: fourth clip (second engagement member, intermediate engagement member)
45: fifth clip (second engagement member, lower engagement member)
45b: fifth clip lower end portion (second lower end)
50: attachment portion
50a: tip portion
50b: base end portion
102: seat cushion
103: seat back
104: headrest
105: pad
106: skin material
107: pull-in portion
108: pull-in groove 108a: bent portion
109: clip
110: pull-in member
110a: main body
111: misalignment suppression member
112: base plate
113: locking piece
114: upright portion
115: locking pawl
116: skin connecting portion
117: bulging portion
118: cutout portion
119: end surface
120: thread
121: pull-in portion
131: pull-in portion
132: pull-in member
133: misalignment suppression member
141: pull-in portion
142: pull-in member
143: misalignment suppression member
144: cutout portion
145: plate
146: opening
147: end surface
151: pull-in portion
152: pull-in member
153: slit
161: pull-in portion
162: pull-in member
163: cutout portion

The invention claimed is:

1. A vehicle seat, comprising:
a frame;
a pad disposed on the frame;
a skin covering the pad;
an airbag device attached to the frame, and including an airbag and an inflator;
a guide member that is provided on an inner surface side of the skin at a position corresponding to the airbag device, and that guides a deployment of the airbag; and
an engagement member that pulls the skin in the pad,
wherein the skin includes a center portion covering a central portion of the pad in a seat width direction, a first side portion joined to an end portion of the center portion in the seat width direction, a second side portion joined to an outer end portion of the first side portion in the seat width direction, a first joint portion at which the center portion and the first side portion are joined to each other, and a second joint portion at which the first side portion and the second side portion are joined to each other,
the first joint portion is engaged with the engagement member, and is pulled in the pad,
a break portion that breaks when the airbag is deployed is formed at the second joint portion,
a first end portion that is an end portion on an outer side of the guide member in the seat width direction is joined to the first side portion at the break portion,
a second end portion that is an end portion on an inner side of the guide member in the seat width direction is joined to the first side portion at the first joint portion, and
a length in an up to down direction from a first upper end to a first lower end of the engagement member is longer than a length in the up to down direction from a first upper end portion to a first lower end portion of the first end portion of the guide member.

2. The vehicle seat according to claim 1,
wherein the first upper end portion of the guide member is disposed above the first upper end of the engagement member, and
a length in the up to down direction between the first upper end portion of the guide member and the first upper end of the engagement member is shorter than the length in the up to down direction from the first upper end to the first lower end of the engagement member.

3. The vehicle seat according to claim 1,
wherein a second upper end portion of the second end portion of the guide member is disposed above the first upper end of the engagement member, and
a second lower end portion of the second end portion of the guide member is disposed below the first lower end of the engagement member.

4. The vehicle seat according to claim 1,
wherein the engagement member includes a first engagement member and a second engagement member disposed below the first engagement member,
the guide member includes a first guide member that is disposed at a position corresponding to a height of a chest of an occupant in the seat and that engages with the first engagement member, and a second guide member that is disposed at a position corresponding to a height of a waist of the occupant in the seat and that engages with the second engagement member, and
a length in the up to down direction from a second upper end to a second lower end of the second engagement member is longer than a length in the up to down direction from a third upper end portion to a third lower end portion on the outer side of the second guide member in the seat width direction.

5. The vehicle seat according to claim 1,
wherein the engagement member includes a first engagement member and a second engagement member disposed below the first engagement member,
the guide member includes a first guide member that is disposed at a position corresponding to a height of a chest of an occupant in the seat and that engages with the first engagement member, and a second guide member that is disposed at a position corresponding to a height of a waist of the occupant in the seat and that engages with the second engagement member, and
a gas blowing portion of the inflator is disposed closer to the first guide member than to the second guide member, and
a length in the up to down direction from a third upper end portion to a third lower end portion on the outer side of the second guide member in the seat width direction is longer than the length in the up to down direction from the first upper end portion to the first lower end portion.

6. The vehicle seat according to claim 1,
wherein the engagement member includes a first engagement member and a second engagement member disposed below the first engagement member,
the guide member includes a first guide member that is disposed at a position corresponding to a height of a chest of an occupant in the seat and that engages with the first engagement member, and a second guide member that is disposed at a position corresponding to a height of a waist of the occupant in the seat and that engages with the second engagement member, and a gas blowing portion of the inflator is disposed closer to the second guide member than to the first guide member, and a length in the up to down direction from a third upper end portion to a third lower end portion on the outer side of the second guide member in the seat width direction is longer than the length in the up to down direction from the first upper end portion to the first lower end portion.

7. The vehicle seat according to claim 1, wherein the engagement member includes a first engagement member and a second engagement member disposed below the first engagement member, the second engagement member includes an upper engagement member, an intermediate engagement member disposed below the upper engagement member, and a lower engagement member disposed below the intermediate engagement member, the guide member includes a first guide member that is disposed at a position corresponding to a height of a chest of an occupant in the seat and that engages with the first engagement member, and a second guide member that is disposed at a position corresponding to a height of a waist of the occupant in the seat and that engages with the second engagement member, and a length in the up to down direction from a third upper end portion to a third lower end portion on the outer side of the second guide member in the seat width direction is longer than the length in the up to down direction from the first upper end portion to the first lower end portion.

8. A method of manufacturing a vehicle seat, comprising:

preparing a frame;

attaching an airbag device to the frame, the airbag device including an airbag and an inflator;

disposing a pad on the frame;

preparing a skin, on an inner surface of which a guide member for guiding a deployment of the airbag is provided;

disposing the guide member at a position corresponding to the airbag device, and covering the pad with the skin; and pulling the skin in the pad via an engagement member, wherein the skin includes a center portion covering a central portion of the pad in a seat width direction, a first side portion joined to an end portion of the center portion in the seat width direction, a second side portion joined to an outer end portion of the first side portion in the seat width direction, a first joint portion at which the center portion and the first side portion are joined to each other, and a second joint portion at which the first side portion and the second side portion are joined to each other, the first joint portion is engaged with the engagement member, and is pulled in the pad, a break portion that breaks when the airbag is deployed is formed at the second joint portion, a first end portion that is an end portion on an outer side of the guide member in the seat width direction is joined to the first side portion at the break portion, a second end portion that is an end portion on an inner side of the guide member in the seat width direction is joined to the first side portion at the first joint portion, and the pulling the skin in the pad via the engagement member includes engaging and pulling the first joint portion of the skin in the engagement member having a length in an up to down direction from a first upper end to a first lower end of the engagement member longer than a length in the up to down direction from a first upper end portion to a first lower end portion of the first end portion of the guide member.

* * * * *